(12) United States Patent
Munro et al.

(10) Patent No.: US 7,217,746 B2
(45) Date of Patent: May 15, 2007

(54) COATING COMPOSITIONS HAVING A GEOMETRICALLY ORDERED ARRAY OF POLYMERIC PARTICLES AND SUBSTRATES COATED THEREWITH

(75) Inventors: Calum H. Munro, Wexford, PA (US); Charles M. Kania, Natrona Heights, PA (US); Umesh C. Desai, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 729 days.

(21) Appl. No.: 09/860,272

(22) Filed: May 18, 2001

(65) Prior Publication Data

US 2002/0019480 A1 Feb. 14, 2002

Related U.S. Application Data

(60) Provisional application No. 60/205,680, filed on May 19, 2000.

(51) Int. Cl.
*C09D 151/00* (2006.01)
*C08L 33/00* (2006.01)
*B05D 5/00* (2006.01)

(52) U.S. Cl. .................. 523/201; 523/206; 524/504; 524/831; 427/256

(58) Field of Classification Search ............. 523/201, 523/206; 524/504, 831, 832
See application file for complete search history.

(56) References Cited

U.S. PATENT DOCUMENTS

| | | | |
|---|---|---|---|
| 3,904,795 A * | 9/1975 | Mercurio | |
| 4,350,782 A | 9/1982 | Küchler et al. | 523/334 |
| 4,613,633 A * | 9/1986 | Sekiya et al. | 523/201 |
| 4,627,689 A | 12/1986 | Asher | 350/362 |
| 4,826,907 A | 5/1989 | Murao et al. | 524/394 |
| 5,021,469 A | 6/1991 | Langerbeins et al. | 523/201 |
| 5,071,904 A | 12/1991 | Martin et al. | 524/458 |
| 5,139,882 A | 8/1992 | Elser et al. | 428/522 |
| 5,356,956 A | 10/1994 | Uemae et al. | 523/201 |
| 5,405,879 A | 4/1995 | Uemae et al. | 523/201 |
| 5,416,181 A * | 5/1995 | Nguyen et al. | |
| 5,618,859 A | 4/1997 | Maeyama et al. | 523/201 |
| 5,627,231 A * | 5/1997 | Shalov et al. | |
| 5,908,908 A | 6/1999 | Vanhoye et al. | 526/318.4 |
| 5,944,994 A | 8/1999 | Asher et al. | 210/500.22 |
| 6,123,845 A | 9/2000 | Asher et al. | 210/500.22 |
| 6,258,185 B1 * | 7/2001 | Branagan et al. | |
| 6,444,260 B2 * | 9/2002 | Kramer et al. | 427/201 |
| 6,531,541 B1 * | 3/2003 | Desai et al. | |
| 2001/0043495 A1 * | 11/2001 | Kumacheva et al. | |

FOREIGN PATENT DOCUMENTS

| | | |
|---|---|---|
| DE | 1669156 | 5/1971 |
| EP | 0703284 | 3/1996 |
| EP | 0761776 | 3/1997 |
| FR | 2673209 | 8/1992 |
| GB | 1462086 | 1/1977 |
| GB | 2081919 | 2/1982 |
| JP | 7-62291 | 3/1995 |
| WO | WO 87/06161 | 10/1987 |
| WO | WO 96/11234 | 4/1996 |
| WO | WO 00/28969 | 5/2000 |
| WO | WO 01/00713 | 1/2001 |

OTHER PUBLICATIONS

Derwent Abstract for JP 10183017 (Sep. 1998).
Derwent Abstract for JP 07292318 (Jan. 1996).
Derwent Abstract for JP 04306273 (Oct. 1993).
Derwent Abstract for JP 09111132 (Jul. 1997).

* cited by examiner

Primary Examiner—Tae H Yoon
(74) Attorney, Agent, or Firm—Diane R. Meyers

(57) ABSTRACT

Coating materials comprising polymeric particles in a geometrically ordered array are disclosed. The particles can be formed from materials having different glass transition temperatures; this allows for phase segregation between areas of different glass transition temperatures within each particle. Typically, at least 50 percent of the particles will form a hexagonal array, capable of exhibiting Bragg diffraction. Because the particles within the array do not coalesce to any appreciable extent, significant surface area is provided by the present coating materials. Thus, the present materials have particularly good sound deadening properties. Substrates coated with the present materials are also disclosed, as are methods for inhibiting sound transmission through a substrate using these coatings.

23 Claims, 14 Drawing Sheets

Height

Phase

Height

Phase

FIG. 22
Height
FIG. 23
Phase
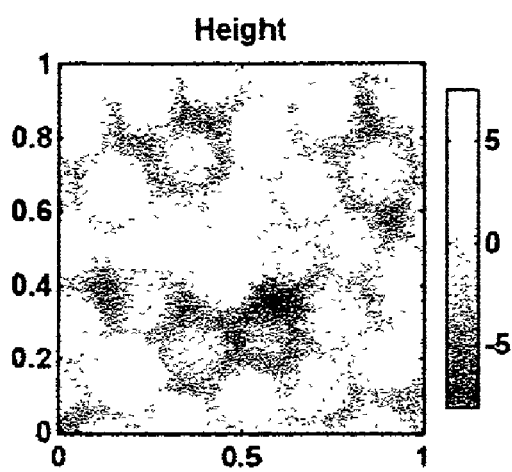
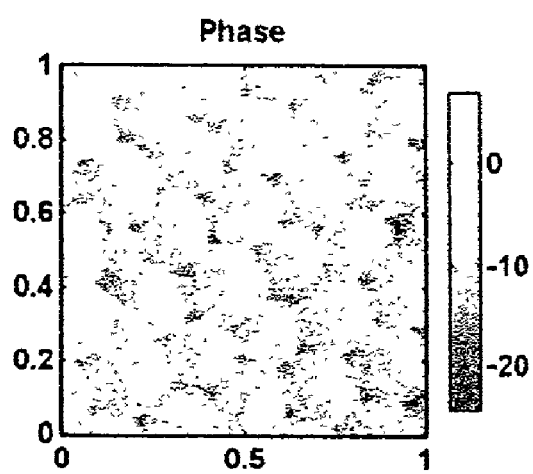
FIG. 24
Height
FIG. 25
Phase
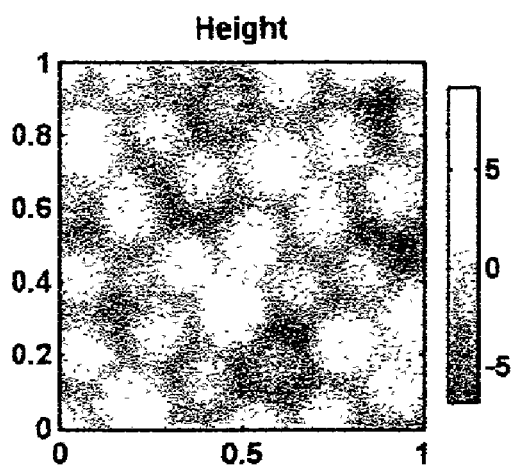
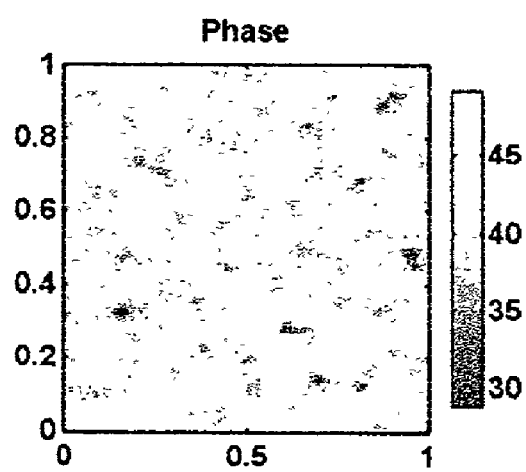

COATING COMPOSITIONS HAVING A GEOMETRICALLY ORDERED ARRAY OF POLYMERIC PARTICLES AND SUBSTRATES COATED THEREWITH

CROSS-REFERENCE TO RELATED APPLICATION

This patent application claims priority to U.S. Provisional Application No. 60/205,680 filed May 19, 2000.

FIELD OF THE INVENTION

The present invention relates generally to coating materials having a geometrically ordered array of unfused polymeric particles, and substrates coated with these materials.

BACKGROUND INFORMATION

Plate-like and irregularly shaped filler components, such as mica, aluminum flakes, inorganic minerals and coarsely ground rubber, can dissipate sound and vibration when oriented in either ordered or non-ordered multilayered arrays in a polymeric film. Many fillers are undesirable for use in waterborne sound deadening applications, however, because they can be difficult to incorporate into a sprayable product, they can exhibit water sensitivity, poor rheology and gassing, and they can be expensive.

Typically, precut asphalt- or rubber-based patches are used for lining floor pans, deck lids and doors of automobiles to dampen or reduce road and engine noise and vibration, preventing them from permeating into the passenger compartment of the motor vehicle. Sprayable coatings that are capable of being applied by robotics are desirable to provide labor and cost savings, reduced part inventories and flexibility in design specifications for damping properties. Waterborne or high solids coatings are desirable in trim shop applications where only air dry cure is feasible. It is desired that these coatings dry quickly, in about 2 to 3 hours after application, so that the coating does not transfer to other parts of the automobile during assembly operations.

Generally, any coating that contains a volatile component such as water must undergo a decrease in volume as the volatile component evaporates from the surface of the coating. As the volatile component leaves the coating, contraction forces act to pull the coating inward in all directions. Without intending to be bound by any theory, it is believed that if the coating has sufficient cohesive strength, the coating will contract in only one dimension; that is, the coating thickness will decrease while the coating resists contraction in any direction parallel to the substrate surface. By contrast, if a coating lacks cohesive strength sufficient to resist contraction parallel to the substrate surface, contraction forces will cause the coating to break up into small flat segments that are separated by continuous linear voids. This surface defect is commonly referred to as "mudcracking".

SUMMARY OF THE INVENTION

The present invention provides coating materials comprised of polymeric particles in a geometrically ordered array. Substrates coated with this material are also provided by the present invention. In one embodiment, the array forms a hexagonal structure within a range of plus or minus 10% of the mean particle size.

As used herein, unless otherwise expressly specified, all numbers such as those expressing values, ranges, amounts or percentages may be read as if prefaced by the word "about", even if the term does not expressly appear. Also, as used herein, the term "polymer" is meant to refer to oligomers and both homopolymers and copolymers.

Molecular weights, whether $M_n$ (number average molecular weight) or $M_w$ (weight average molecular weight), are determined by gel permeation chromatography using polystyrene as a standard; this procedure is well known to those skilled in the art and is discussed in U.S. Pat. No. 4,739,019 at column 4, lines 2–45, which is incorporated herein by reference in its entirety.

Glass transition temperature ($T_g$) (° C.) of the polymeric particles is determined using a Differential Scanning Calorimeter (DSC), for example a Perkin Elmer Series 7 Differential Scanning Calorimeter, using a temperature range of about −55° C. to about 150° C. and a scanning rate of about 20° C. per minute. The Fox equation is used to calculate a theoretical microparticle glass transition temperature ($T_g$) (° C.) as is well known to those skilled in the art.

BRIEF DESCRIPTION OF THE FIGURES

FIG. 22 is a topographical (height) atomic force microscope image of a film formed from Sample 4 latex material according to the present invention after light tapping.

FIG. 23 is a chemical phase atomic force microscope image of a film formed from Sample 4 latex material according to the present invention after light tapping.

FIG. 24 is a topographical (height) atomic force microscope image of a film formed from Sample 4 latex material according to the present invention after hard tapping.

FIG. 25 is a chemical phase atomic force microscope image of a film formed from Sample 4 latex material according to the present invention after hard tapping.

DETAILED DESCRIPTION OF THE INVENTION

Figure 1:
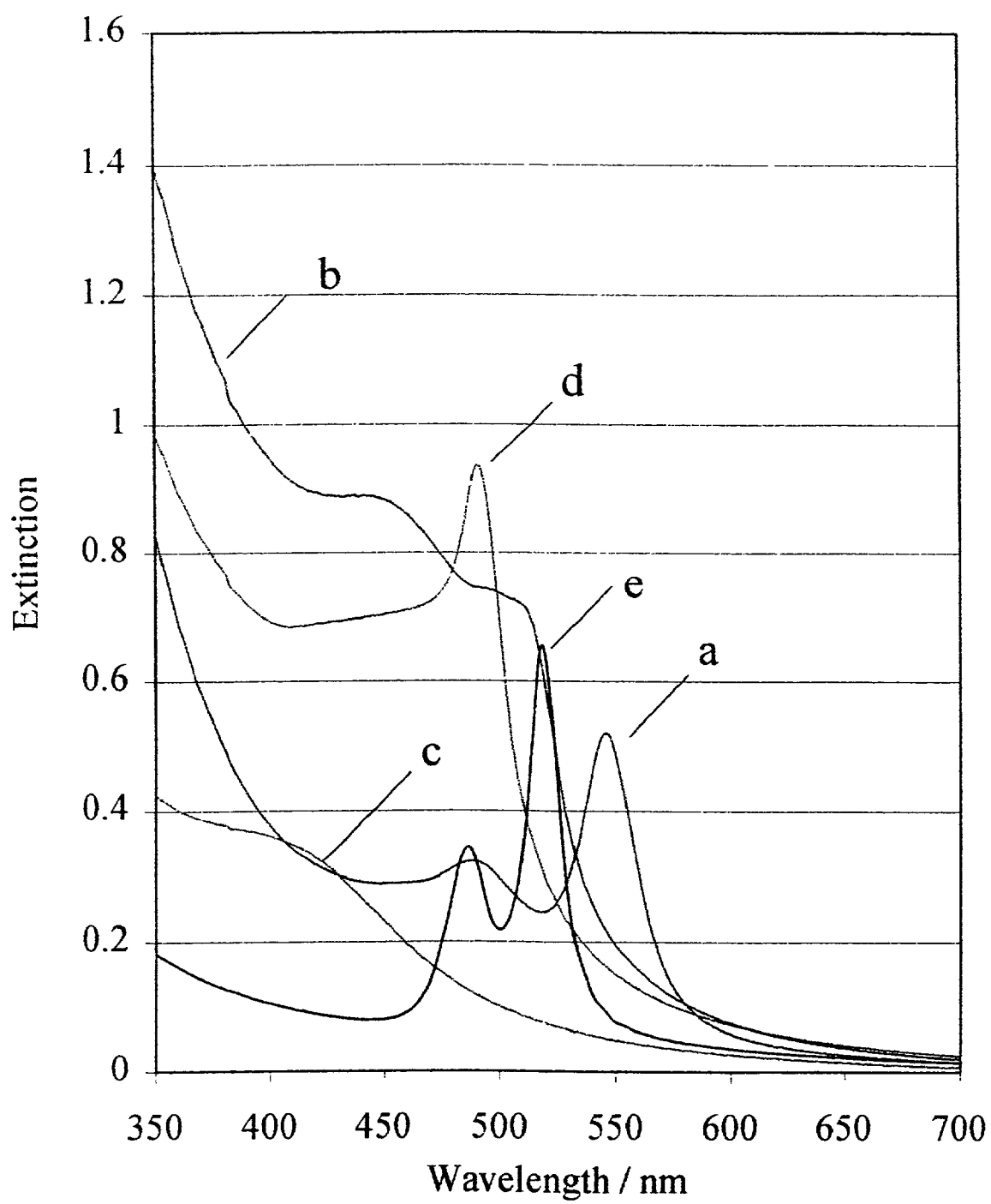
FIG. 1 is a graph of extinction as a function of wavelength (nm) for coatings prepared using latex materials according to the present invention (a–c and e), showing narrow wavelength range extinction features due to Bragg diffraction.
Figure 2:
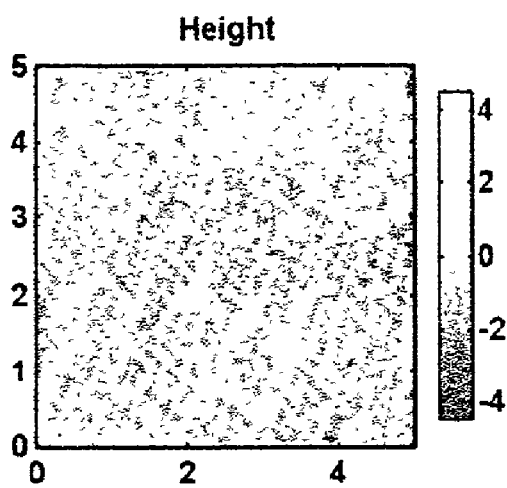
FIG. 2 is a topographical (height) atomic force microscope image of a film formed from Sample 1 latex material according to the present invention after light tapping.
Figure 3:
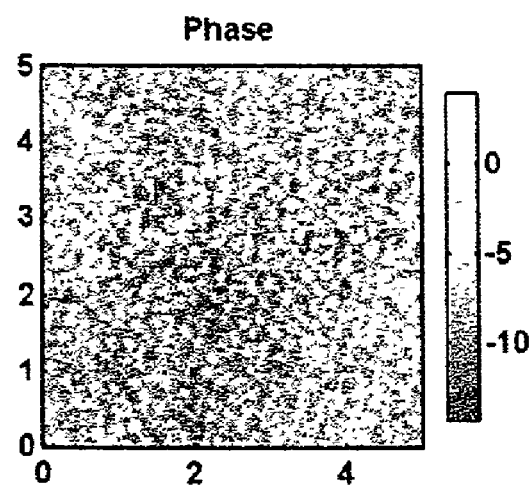
FIG. 3 is a chemical phase atomic force microscope image of a film formed from Sample 1 latex material according to the present invention after light tapping.
Figure 4:
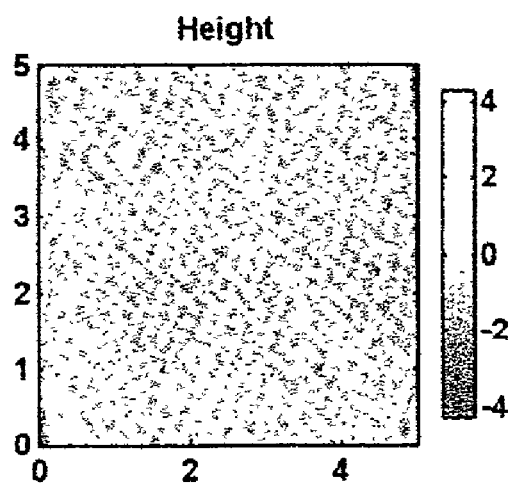
FIG. 4 is a topographical (height) atomic force microscope image of a film formed from Sample 1 latex material according to the present invention after hard tapping.
Figure 5:
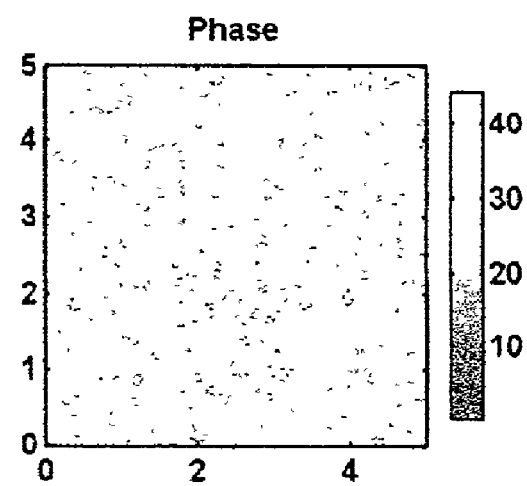
FIG. 5 is a chemical phase atomic force microscope image of a film formed from Sample 1 latex material according to the present invention after hard tapping.
Figure 6:
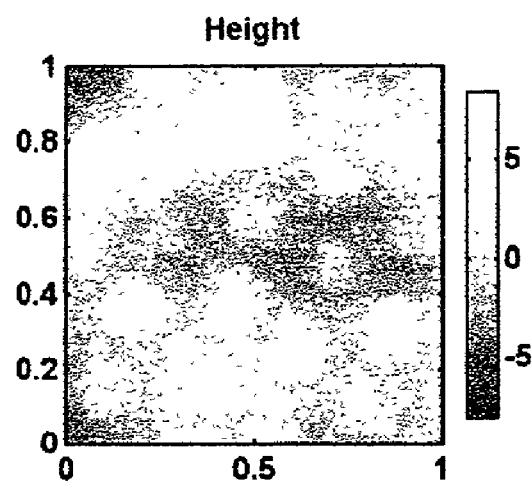
FIG. 6 is a topographical (height) atomic force microscope image of a film formed from Sample 1 latex material according to the present invention after light tapping.
Figure 7:
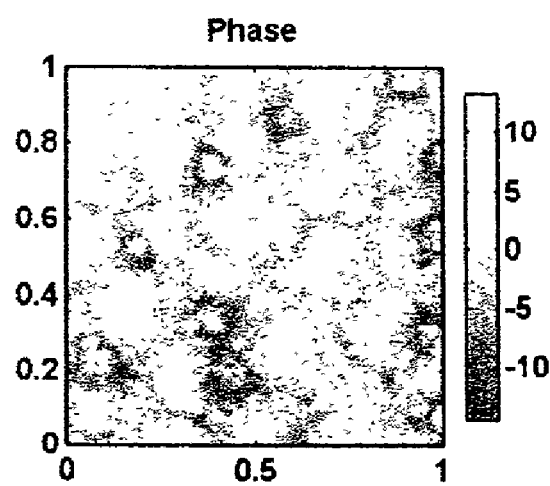
FIG. 7 is a chemical phase atomic force microscope image of a film formed from Sample 1 latex material according to the present invention after light tapping.
Figure 8:
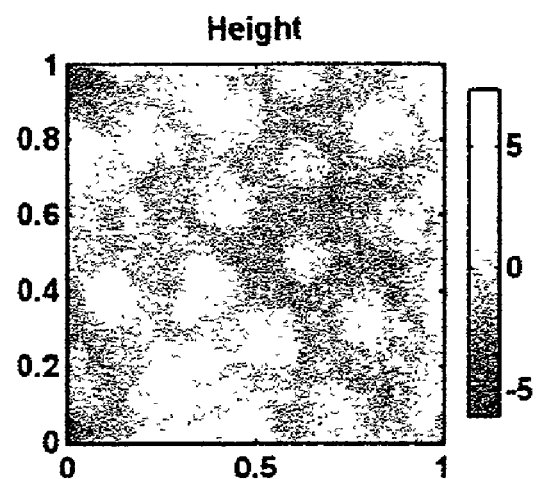
FIG. 8 is a topographical (height) atomic force microscope image of a film formed from Sample 1 latex material according to the present invention after hard tapping.
Figure 9:
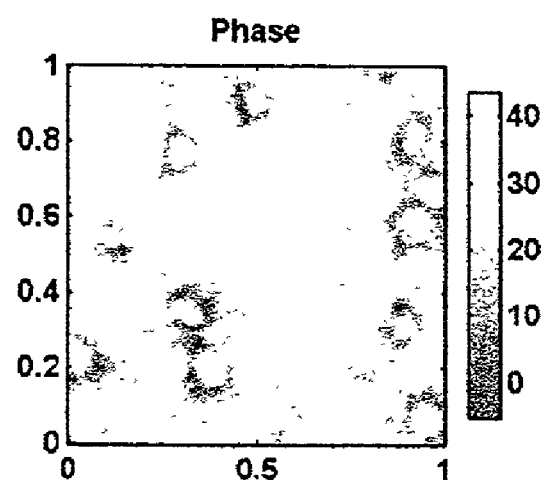
FIG. 9 is a chemical phase atomic force microscope image of a film formed from Sample 1 latex material according to the present invention after hard tapping.
Figure 10:
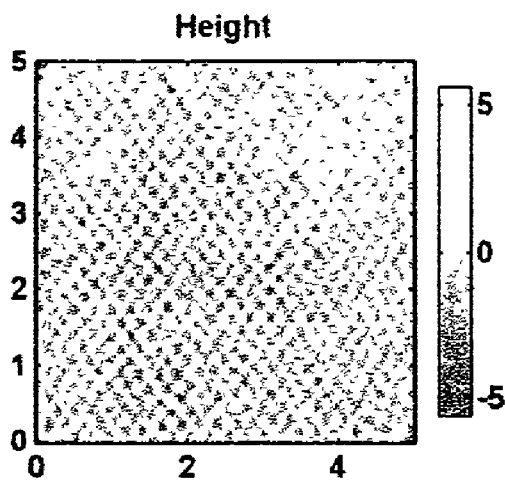
FIG. 10 is a topographical (height) atomic force microscope image of a film formed from Sample 3 latex material according to the present invention after light tapping.
Figure 11:
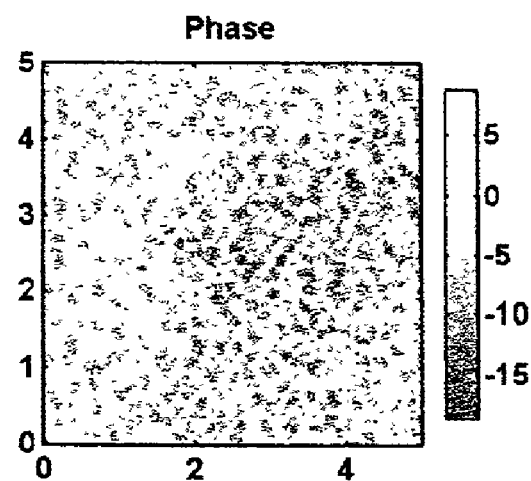
FIG. 11 is a chemical phase atomic force microscope image of a film formed from Sample 3 latex material according to the present invention after light tapping.
Figure 12:
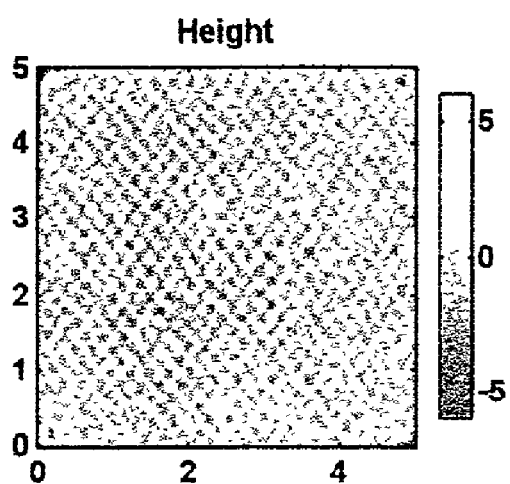
FIG. 12 is a topographical (height) atomic force microscope image of a film formed from Sample 3 latex material according to the present invention after hard tapping.
Figure 13:
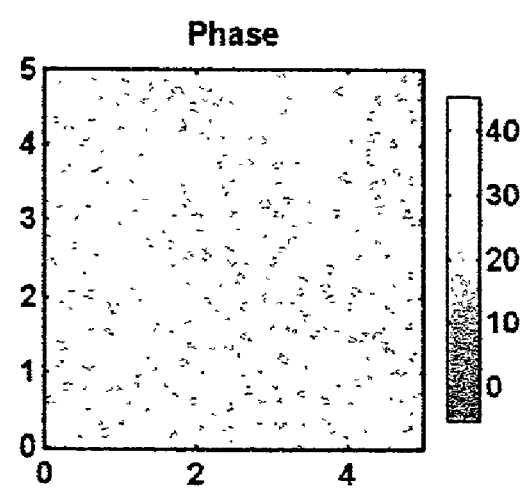
FIG. 13 is a chemical phase atomic force microscope image of a film formed from Sample 3 latex material according to the present invention after hard tapping.
Figure 14:
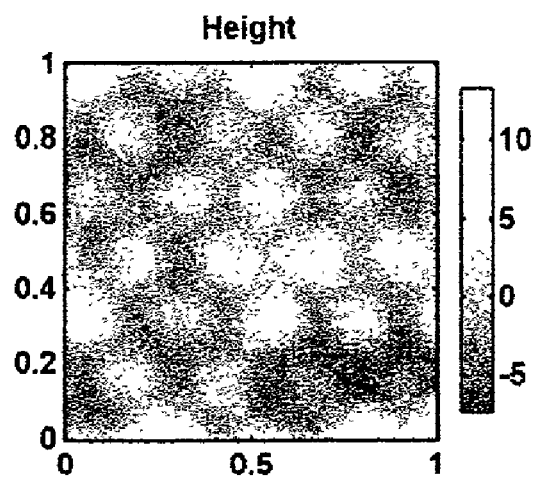
FIG. 14 is a topographical (height) atomic force microscope image of a film formed from Sample 3 latex material according to the present invention after light tapping.
Figure 15:
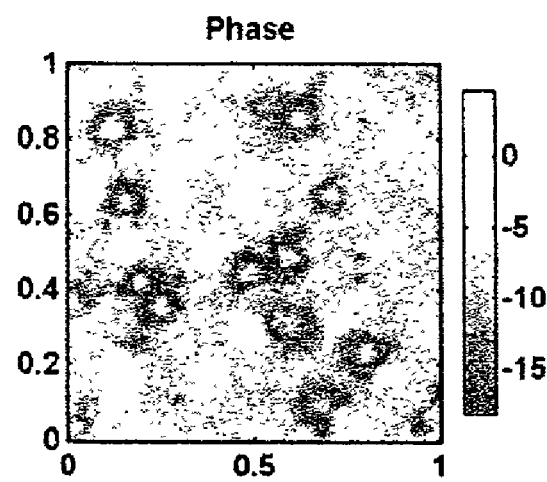
FIG. 15 is a chemical phase atomic force microscope image of a film formed from Sample 3 latex material according to the present invention after light tapping.
Figure 16:
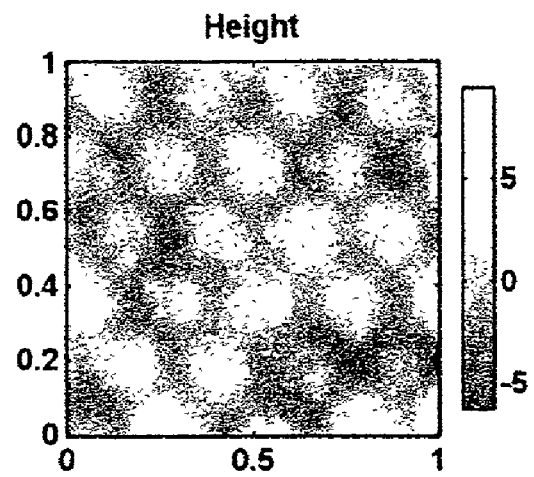
FIG. 16 is a topographical (height) atomic force microscope image of a film formed from Sample 3 latex material according to the present invention after hard tapping.
Figure 17:
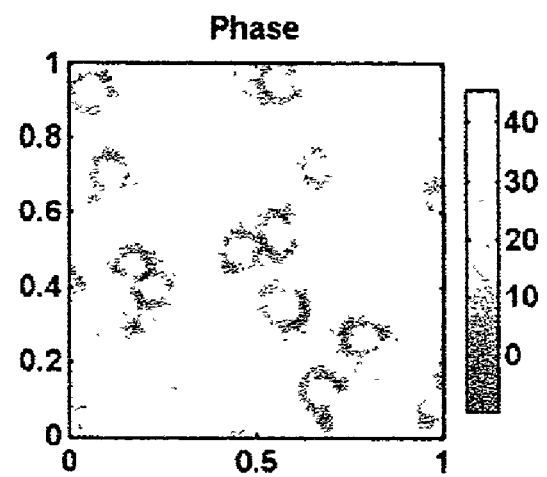
FIG. 17 is a chemical phase atomic force microscope image of a film formed from Sample 3 latex material according to the present invention after hard tapping.
Figure 18:
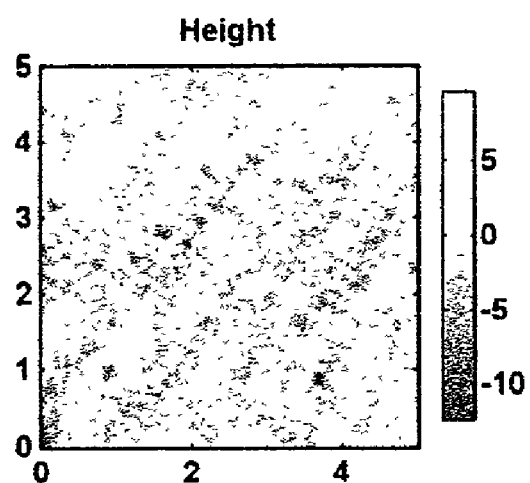
FIG. 18 is a topographical (height) atomic force microscope image of a film formed from Sample 4 latex material according to the present invention after light tapping.
Figure 19:
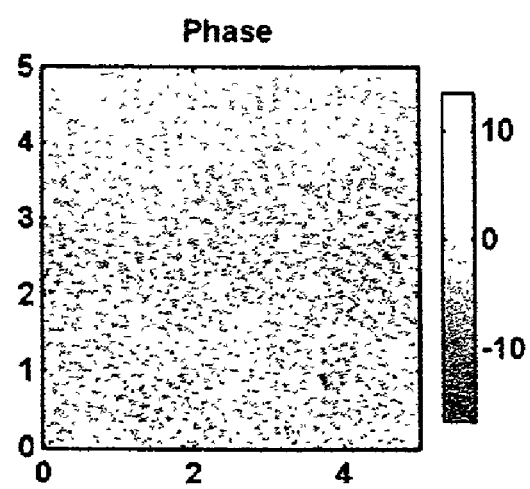
FIG. 19 is a chemical phase atomic force microscope image of a film formed from Sample 4 latex material according to the present invention after light tapping.
Figure 20:
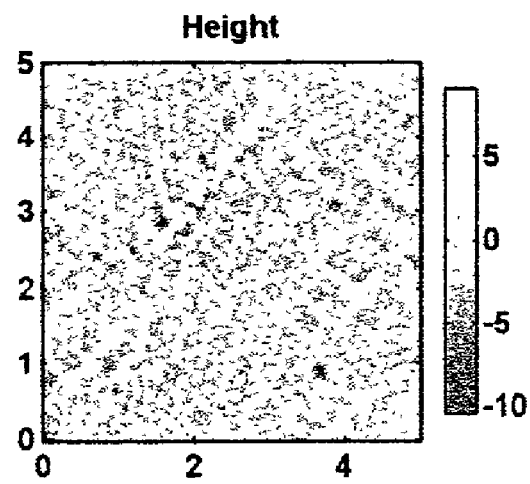
FIG. 20 is a topographical (height) atomic force microscope image of a film formed from Sample 4 latex material according to the present invention after hard tapping.
Figure 21:
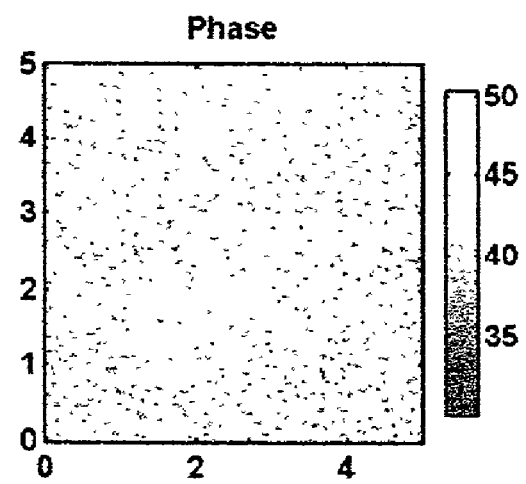
FIG. 21 is a chemical phase atomic force microscope image of a film formed from Sample 4 latex material according to the present invention after hard tapping.
Figure 26:
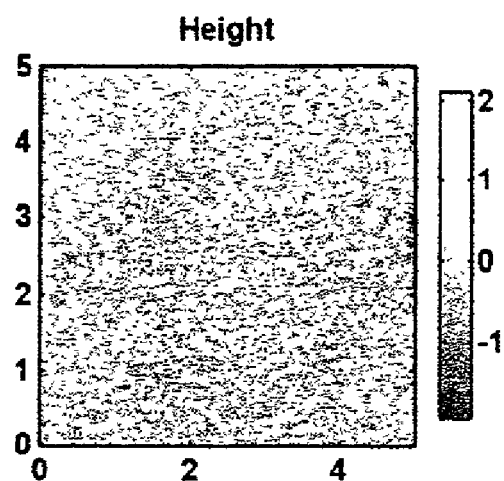
FIG. 26 is a topographical (height) atomic force microscope image of a film formed from Sample 2 latex material after light tapping.
Figure 27:
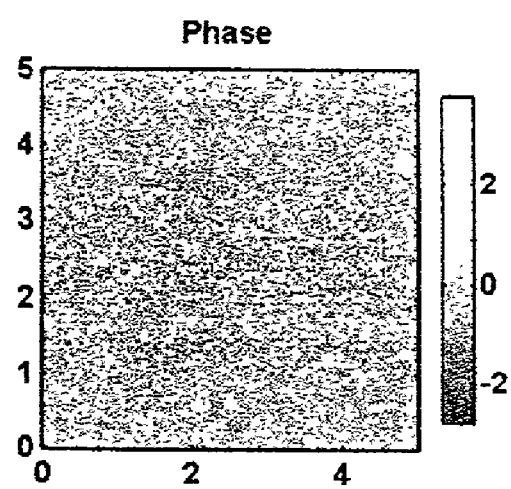
FIG. 27 is a chemical phase atomic force microscope image of a film formed from Sample 2 latex material after light tapping.
Figure 28:
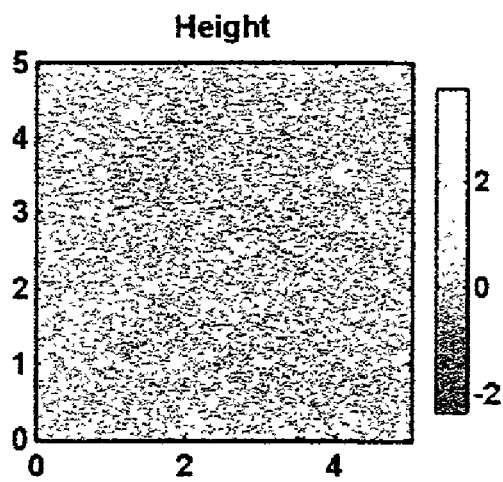
FIG. 28 is a topographical (height) atomic force microscope image of a film formed from Sample 2 latex material after hard tapping.
Figure 29:
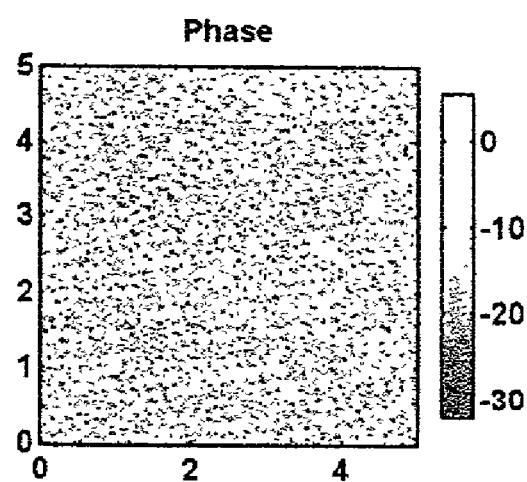
FIG. 29 is a chemical phase atomic force microscope image of a film formed from Sample 2 latex material after hard tapping.
Figure 30:
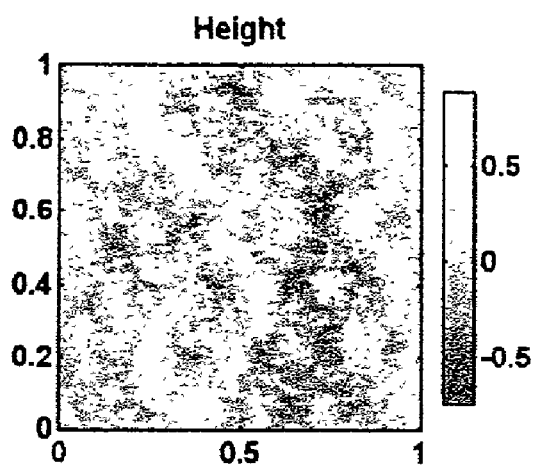
FIG. 30 is a topographical (height) atomic force microscope image of a film formed from Sample 2 latex material after light tapping.
Figure 31:
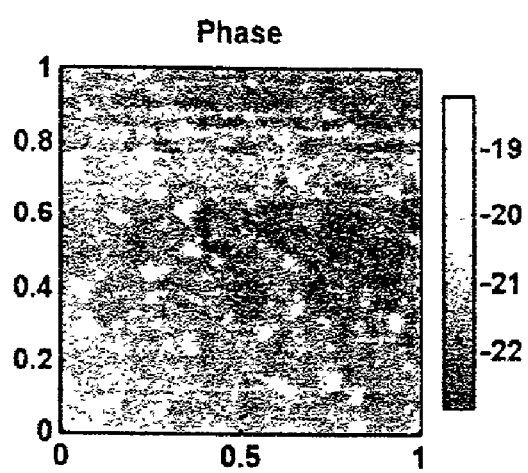
FIG. 31 is a chemical phase atomic force microscope image of a film formed from Sample 2 latex material after light tapping.
Figure 32:
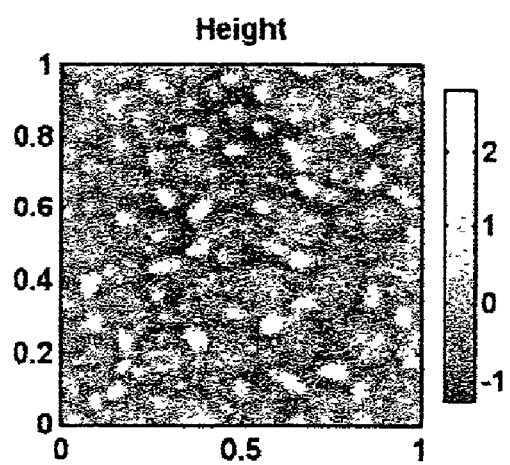
FIG. 32 is a topographical (height) atomic force microscope image of a film formed from Sample 2 latex material after hard tapping.
Figure 33:
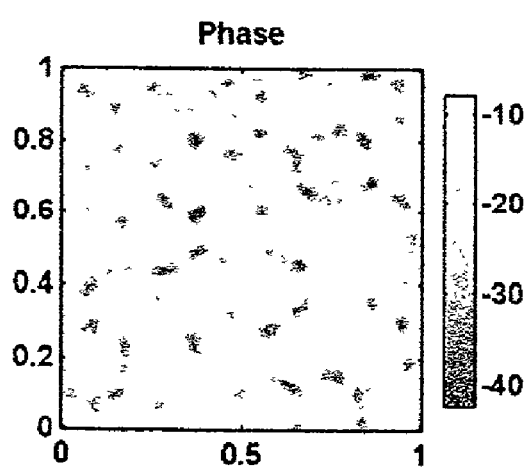
FIG. 33 is a chemical phase atomic force microscope image of a film formed from Sample 2 latex material after hard tapping.
Figure 34:
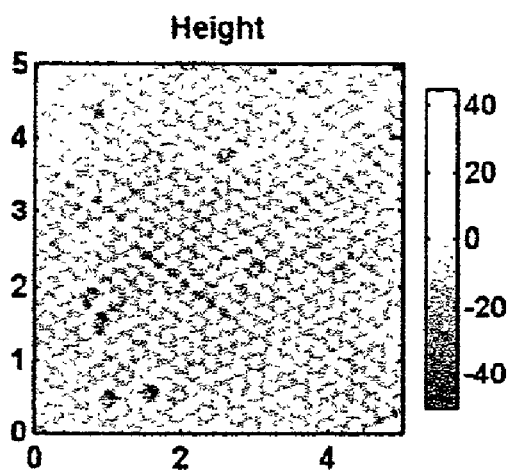
FIG. 34 is a topographical (height) atomic force microscope image of a film formed from Sample 5 latex material according to the present invention after light tapping.
Figure 35:
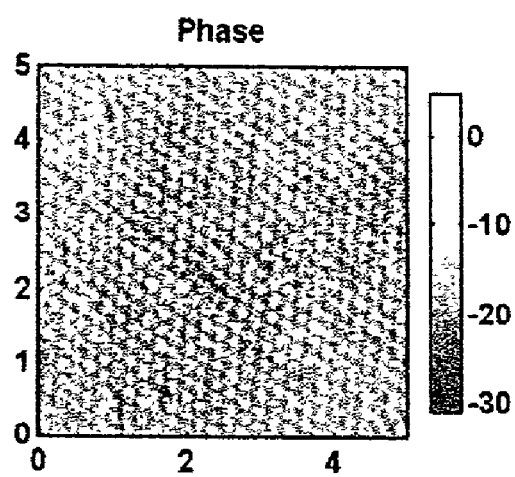
FIG. 35 is a chemical phase atomic force microscope image of a film formed from Sample 5 latex material according to the present invention after light tapping.
Figure 36:
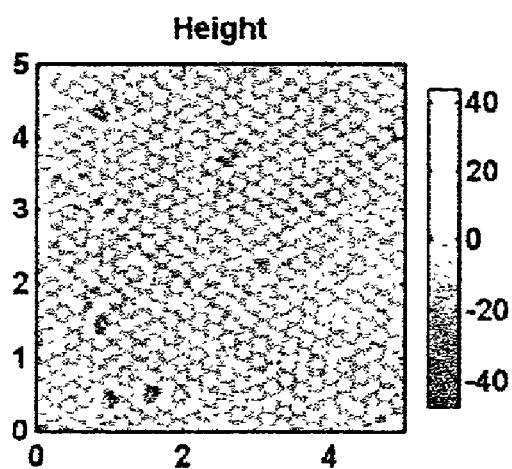
FIG. 36 is a topographical (height) atomic force microscope image of a film formed from Sample 5 latex material according to the present invention after hard tapping.
Figure 37:
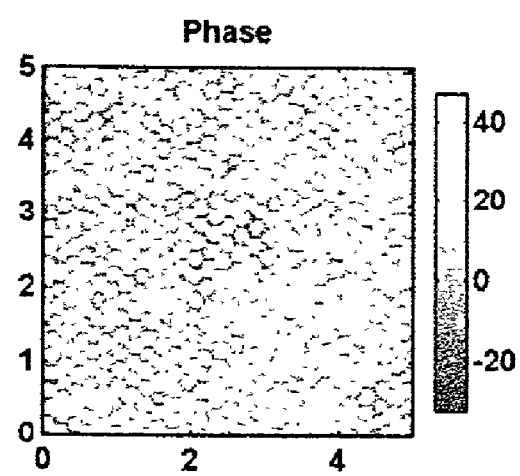
FIG. 37 is a chemical phase atomic force microscope image of a film formed from Sample 5 latex material according to the present invention after hard tapping.
Figure 38:
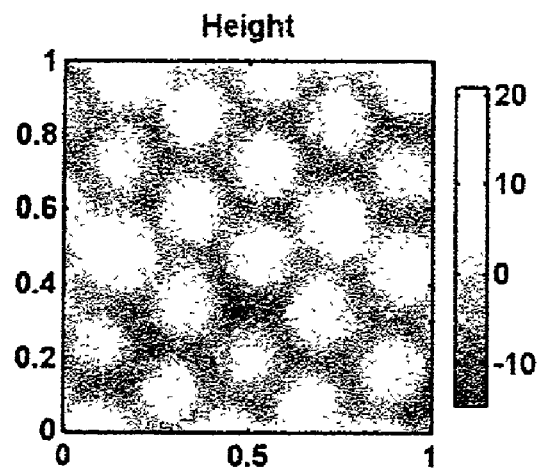
FIG. 38 is a topographical (height) atomic force microscope image of a film formed from Sample 5 latex material according to the present invention after light tapping.
Figure 39:
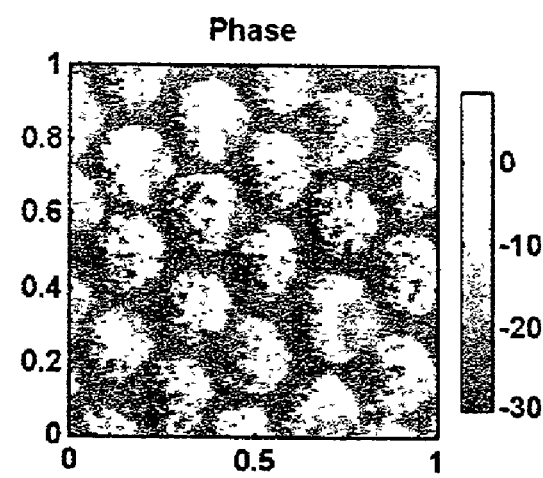
FIG. 39 is a chemical phase atomic force microscope image of a film formed from Sample 5 latex material according to the present invention after light tapping.
Figure 40:
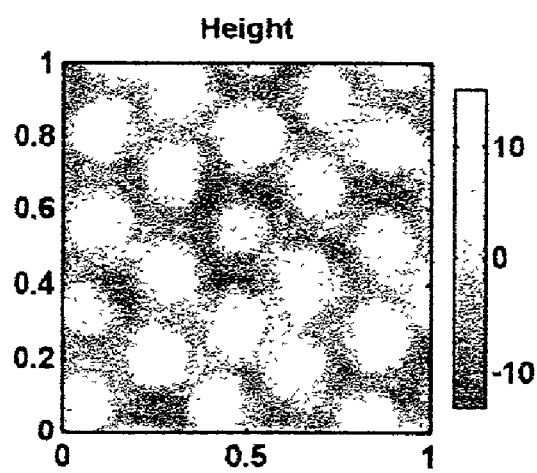
FIG. 40 is a topographical (height) atomic force microscope image of a film formed from Sample 5 latex material according to the present invention after hard tapping.
Figure 41:
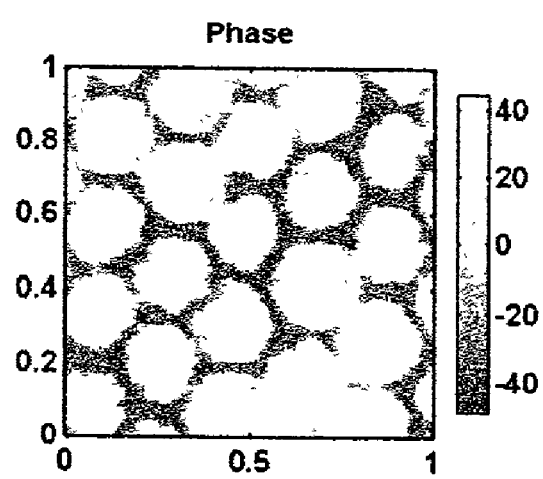
FIG. 41 is a chemical phase atomic force microscope image of a film formed from Sample 5 latex material according to the present invention after hard tapping.
Figure 42:
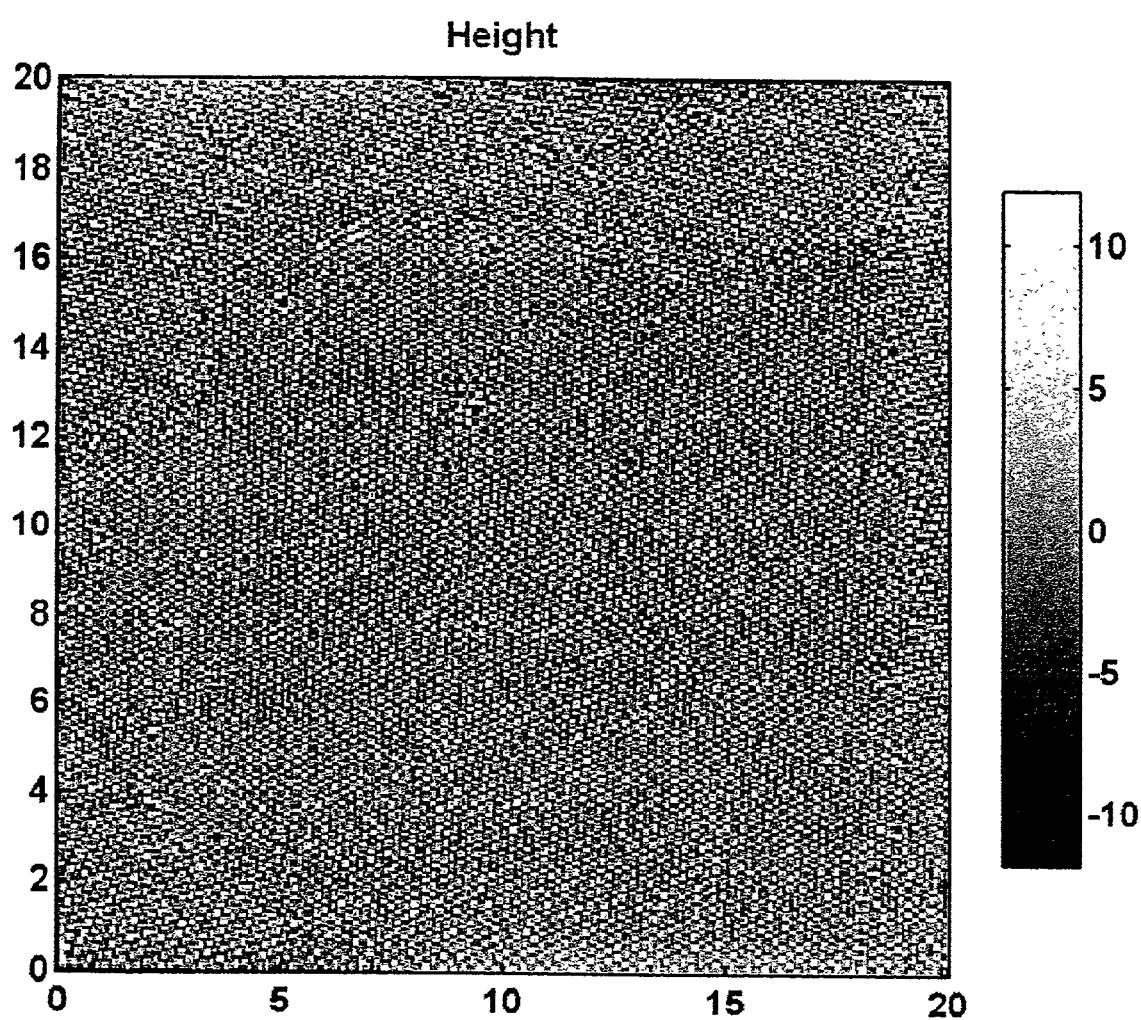
FIG. 42 is an atomic force microscope image of a film formed from Sample 5 latex material according to the present invention after hard tapping.
Figure 43:
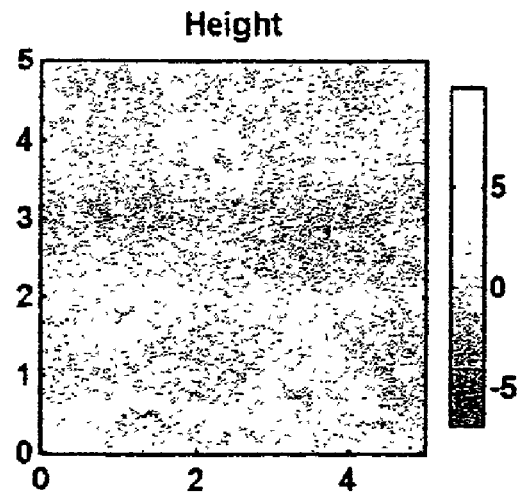
FIG. 43 is a topographical (height) atomic force microscope image of a film formed from ACRONAL latex.
Figure 44:
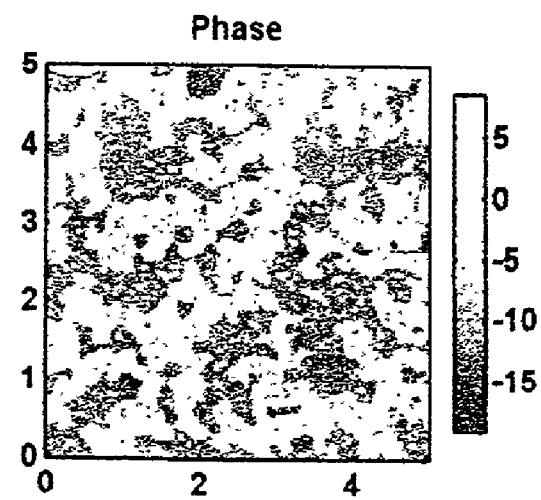
FIG. 44 is a chemical phase atomic force microscope image of a film formed from ACRONAL latex material after light tapping.
Figure 45:
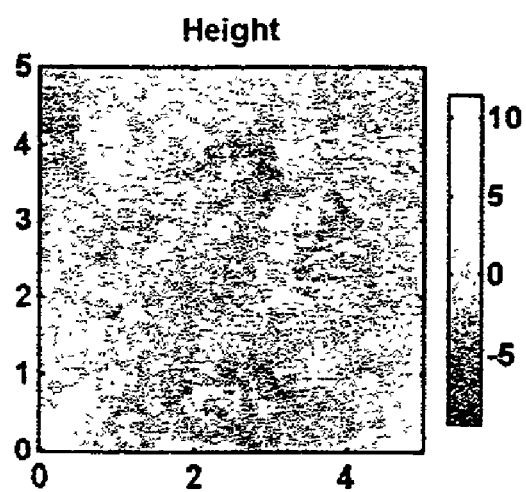
FIG. 45 is a topographical (height) atomic force microscope image of a film formed from ACRONAL latex material after hard tapping.
Figure 46:
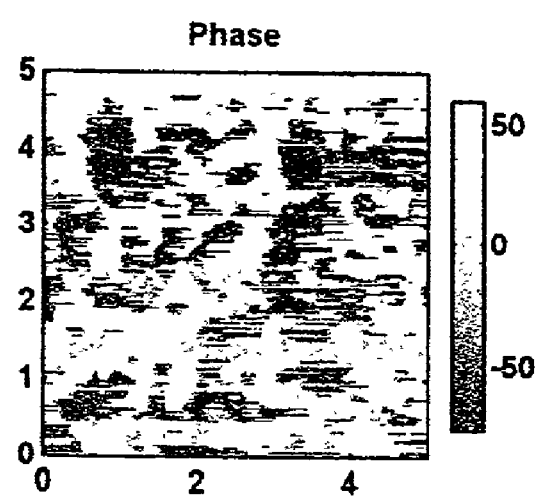
FIG. 46 is a chemical phase atomic force microscope image of a film formed from ACRONAL latex material after hard tapping.
Figure 47:
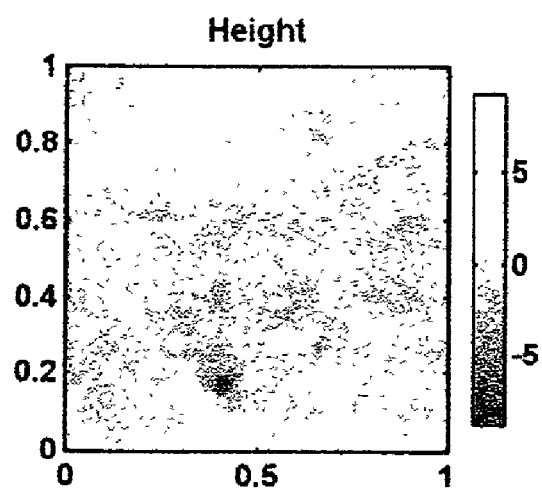
FIG. 47 is a topographical (height) atomic force microscope image of a film formed from ACRONAL latex material after light tapping.
Figure 48:
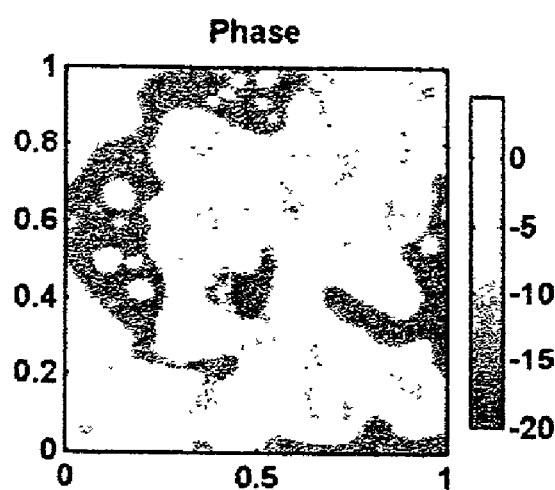
FIG. 48 is a chemical phase atomic force microscope image of a film formed from ACRONAL latex material after light tapping.
Figure 49:
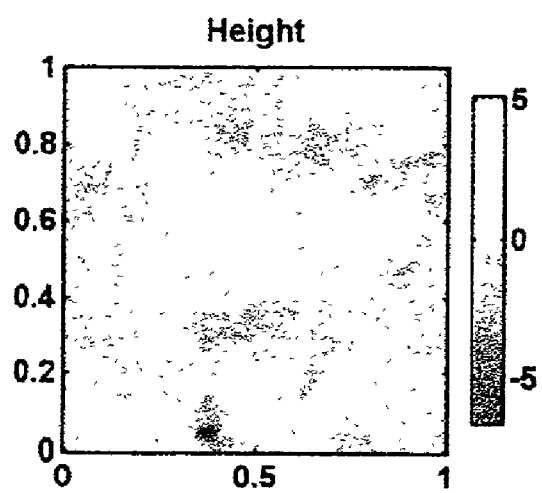
FIG. 49 is a topographical (height) atomic force microscope image of a film formed from ACRONAL latex material after hard tapping.
Figure 50:
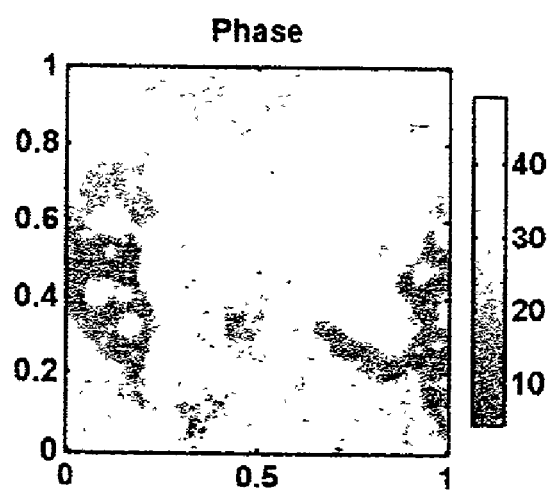
FIG. 50 is a chemical phase atomic force microscope image of a film formed from ACRONAL latex material after hard tapping.

The present invention is directed to a coating material comprising polymeric particles. The polymeric particles are present in a substantially geometrically ordered array or lattice of essentially monodispersed polymeric particles that can provide sound deadening properties to the dried coating. In one embodiment, there are multiple layers of arrays.

The present invention is further directed to a substrate coated with the coating material of the present invention. Typically, the coating is applied to the substrate by depositing the coating on the substrate and allowing the coating to dry. The dried residue comprises a geometrically ordered array of polymeric particles.

The particles are deposited in a highly ordered structure resembling that of atoms in an atomic crystal; typically, the structure is a hexagonal close packed structure ("HCC") such as is described in P. Atkins, Physical Chemistry ($3^{rd}$ Ed. 1986) at pages 566–567, which is incorporated herein by reference. In one embodiment, at least about 5 percent, and in another embodiment at least about 50 percent, of the particles are present in a hexagonal structure.

It is a feature of the present invention that the polymeric particles do not appreciably fuse or coalesce upon drying.

This is apparent from the atomic force microscope images discussed in the example section below. "Fuse" as used herein refers to "sticking together" of the surfaces of the various particles, wherein the particles may still retain some, but not all, of their individual integrity. "Coalesce" refers to the forming of a mass of particles, and will be further understood as referring to the tendency of individual particles or droplets of the coating composition, such as would result upon atomization of a liquid coating when spray applied, to flow together. When applied to the substrate surface, coalesced particles would form a continuous film upon the substrate, that is, a coating substantially free from voids, discontinuities or areas of very low film thickness between the coating particles. Such a coating would have decreased surface area. In contrast, the substantially uncoalesced film formed upon drying of the present coating material allows the particles to retain their integrity. Thus, a closely packed structure with minimal coalescence is formed. Such a structure is desirable to provide as much particle interaction as possible, while maintaining as much of the distinctiveness of the individual particles as possible; this facilitates energy dissipation. Uncoalesced particles are further preferred because individual particles maintain large interfacial surfaces to facilitate dissipation of energy from sound.

It is a further feature of certain embodiments of the present invention that the polymeric particles can exhibit phase segregation between areas of high and low density, or hard and soft polymeric material within each particle. Stated another way, at least some of the particles in the present coating compositions will be comprised of two or more materials having different Tg values. Segregation of the chemical species into phases of different physical properties occurs within individual particles. The result is that the regions of different physical properties are much smaller and therefore a larger number of regions are present in the total film. This again provides a high interfacial surface area, desirable for energy dissipation. Thus, the present compositions are quite distinct from mixtures containing particles of a first Tg and particles of a second Tg, or coatings with coalesced or fused particles, in which the number of regions would be decreased.

It is yet another feature of the present invention that the coatings disclosed herein will Bragg diffract a narrow wavelength of light. Bragg diffraction, sometimes called Bragg reflection, is an interference effect that results from waves of light scattered by planes of scatterers within an ordered three dimensional array such that the spacing between the layers of scatterers in this array is constant and comparable to half the wavelength of the light that is being scattered. As the present coatings dry, the spacing between the particles decreases; in turn, the range of wavelengths of reflective light decreases relative to the interparticle spacing. The periodicity is the spacing between particles measured from the center of a particle to the center of an adjacent particle. The wavelength of light that exhibits Bragg diffraction is dependent upon the spacing between the planes of scatterers and is described by Bragg's law (sometimes called the Bragg condition) as outlined in University Physics Seventh Edition by Sears, Zemansky and Young at pages 938–939 (Addison-Wesley Publishing Company, Inc., Reading, Mass. (1988), which is incorporated by reference herein.

The Bragg diffraction of the present coating and composition is a factor of the ordering of the particles, due to particle size, particle concentration, and the spacing below layers of the ordered structures. Particles that coalesce will not Bragg diffract, whereas particles that barely touch, such as those in the present composition, will Bragg diffract. Thus, the ability of present compositions to Bragg diffract confirms that there is no coalescence; if any minor amount of coalescence does occur, it is not substantial, i.e. it is not at a level that will interfere with the Bragg diffraction of the material.

In one embodiment, the particles have a mean particle size (spherical diameter) ranging from about 0.01 to about 5 microns, such as about 0.05 to about 0.5 microns, as determined by light scattering techniques or electron microscopy techniques that are well known to one skilled in the art. Spherical particles having a diameter of about 0.15 microns are particularly suitable. It will be appreciated that the small particle size used in the present coatings provides significant surface area; increased surface area correlates with increased sound deadening properties. The particles are filled as opposed to hollow. Mixtures of particles having different compositions and sizes can be used in the present invention, but if the particles are differently sized, they are typically within a range of size of +/−10% of the mean particle size, i.e., essentially monodispersed. The mean distance between particles generally ranges from about 0.01 to about 5 microns, or about 0.05 to about 0.5 microns; thus, the distance between particles as measured from the center of each particle is the same as the diameter or size of the particles.

The theoretical glass transition temperature of a homopolymer prepared from an individual monomer which will be used in the formulation of the particles ranges from about −90° C. to about 175° C., such as about −65° C. to about +135° C. In one embodiment, a mixture of monomers having different glass transition temperatures is used to prepare the particles; this provides the particles with phase segregation, or regions within the particles that have relatively different glass transition temperatures. The difference ("Δ") in glass transition temperature from the contributing monomers used to prepare the particles can range from about 50° C. to about 260° C. Thus, monomers can be selected for preparation of the particles that contribute differing glass transition temperatures; an example is the use of polybutyl acrylate (with a Tg of about −55° C.) and polymethyl methacrylate or polyacrylonitrile (with a Tg of about +100° C.). Particles having low calculated glass transition temperature (i.e. less than about 0° C.) tend to deform and not provide good packing, whereas particles having high calculated glass transition temperature (i.e. greater than about 0° C.) resist deformation and retain particle identity, as shown in the figures. When particles are prepared from monomers having a Δ of greater that about 260° C., one or more additional monomers that will bring the Δ to within the desired range provides compatibility and facilitates polymerization. Segments of certain polymer chains can orient themselves such that segments of similar chemical structure can aggregate or associate. This forms phases of differing physical properties, such as density or elastic response, which again facilitates sound dissipation. Similarly, domains in different particles which are prepared from monomers having similar or identical chemical structure can orient to be near each other in the coating.

Phase segregation (regions having different glass transition temperatures) within each particle can facilitate sound dissipation because the interfaces between the phases can dissipate, deflect or absorb the sound energy more efficiently than particles having all the same phase. Also, regions within the particle having different glass transition temperatures can broaden the range of temperatures at which different frequencies of sound can be effectively dissipated. For example, one region might be particularly effective at dissipating sound frequencies at temperatures below room temperature, while another region might be particularly effective at dissipating sound frequencies at temperatures much higher. In this manner, sound frequencies can be dissipated through a wide range of environmental temperatures, such as those experienced during the hottest summer to the coldest winter. The sound frequency range capable of being dissipated by the present coatings can range, for example, from about 400 Hz to about 20,000 Hz.

The present coating composition comprises one or more aqueous dispersions of polymeric particles. As used herein, the term "dispersion" means that the particles are capable of being distributed throughout water as finely divided particles, such as a latex. The uniformity of the dispersion can be increased by the addition of wetting, dispersing or emulsifying agents (surfactants), which are discussed below.

Preferably, the polymeric particles are thermoplastic, although the polymeric particles can include functionality that would permit crosslinking with suitable crosslinking agents such as aminoplasts and polyisocyanates, or they can be internally crosslinked using multifunctional (meth)acrylates. The polymeric particles are essentially hydrophobic but have some hydrophilic character to enable dispersion in water.

The polymeric particles can be prepared from components comprising one or more nitrile materials, such as acrylonitrile, methacrylonitrile, macromonomers, copolymers, and esters thereof, nitrile rubbers and mixtures thereof. Useful nitrile materials also include polymers having both vinyl and nitrile groups. Transesterification products of cyanoacetic acid with hydroxyl functional materials are also useful. The nitrile functional material generally comprises about 1 to about 95 weight percent of the components used to prepare the polymeric particles on a basis of total weight of the components used to prepare the polymeric particles, such as about 15 to about 40 weight percent.

In an alternative embodiment, in lieu of or in addition to the nitrile materials discussed above, the polymeric particles can be prepared from components comprising one or more amide functional materials, including, for example, amide functional polymers and ethylenically unsaturated monomers, such as acrylamides, methacrylamides or n-butoxy methacrylamide and polymers and copolymers thereof. The amide functional material generally comprises about 1 to about 95 weight percent of the components used to prepare the polymeric particles on a basis of total weight of the components used to prepare the polymeric particles, such as about 15 to about 40 weight percent.

In another embodiment, in lieu of or in addition to the nitrile materials and/or amide functional polymers discussed above, carbamate functional materials can be included in the polymeric particles, for example by copolymerizing the nitrile materials and/or amide functional materials with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Other useful carbamate functional monomers are disclosed in U.S. Pat. No. 5,098,947, which is incorporated herein by reference. The carbamate functional material generally comprises about 1 to about 95 weight percent of the components used to prepare the polymeric particles on a basis of total weight of the components used to prepare the polymeric particles, such as about 15 to about 40 weight percent.

In one embodiment, the components used to prepare the polymeric particles further comprise one or more polyoxyalkylene acrylates, which can reduce mudcracking in the coating composition. Generally, the polyoxyalkylene acrylate comprises a backbone of repeating alkylene glycol units. The polyoxyalkylene acrylate can be terminated at one end with an acrylate group and at the other end with an alkoxy group containing about 1 to about 6 carbon atoms. The polyoxyalkylene acrylate can further comprise one or more pendant functional groups such as hydroxy, amido, carboxy, carbamate, urea, mercapto or urethane. The polyoxyalkylene acrylate can have one or more terminal alkoxy groups such as methoxy groups, ethoxy groups, butoxy groups, pentoxy groups and hexoxy groups.

The polyoxyalkylene acrylate can have a structure (including isomers thereof) as shown in Formula (I) below:

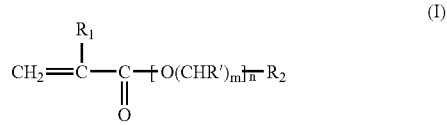

(I)

wherein $R_1$ is H or $CH_3$; $R_2$ is a terminal alkoxy group containing about 1 to about 6 carbon atoms; R' is independently selected from H or $CH_3$; m is an integer ranging from about 2 to about 4; and n is an integer ranging from about 2 to about 200, such as about 3 to about 40, or from about 4 to about 20.

Non-limiting examples of suitable polyoxyalkylene acrylates include alkoxy polyoxyethylene acrylates, alkoxy polyoxyethylene methacrylates, alkoxy polyoxypropylene acrylates, alkoxy polyoxypropylene methacrylates, alkoxy polyoxyethyleneoxypropylene acrylates, alkoxy polyoxyethyleneoxypropylene methacrylates, alkoxy polyoxybutylene acrylates, alkoxy polyoxybutylene methacrylates, copolymers and mixtures thereof. In one embodiment, the polyoxyalkylene acrylate is methoxy polyoxyethylene methacrylate (also known as methoxy polyethylene glycol methacrylate), such as that which is commercially available from La Porte Chemicals, Houston, Tex., as MA-550.

The polyoxyalkylene acrylate can comprise about 1 to about 99 weight percent of the components used to produce the polymeric particles based upon the total weight of components used to produce the polymeric particles, such as about 1 to about 20 weight percent, or about 3 to about 7 weight percent.

The components used to prepare the polymeric particles can further comprise one or more copolymerizable ethylenically unsaturated monomers that are chemically different from any of the other functional materials. The polymeric particles can be self-crosslinking, for example by forming the polymeric particles from acrylic monomers capable of internally crosslinking such as n-alkoxyacrylamide, or crosslinked by reaction with suitable crosslinking materials included in the film-forming composition. The polymeric particles can be cationic, anionic or nonionic, but are preferably anionic.

Non-limiting examples of useful ethylenically unsaturated carboxylic acid monomers include acrylic acid, methacrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof.

Non-limiting examples of useful ethylenically unsaturated vinyl monomers include alkyl esters of acrylic and methacrylic acids, such as methyl acrylate, ethyl acrylate, methyl methacrylate, ethyl methacrylate, butyl acrylate, butyl methacrylate, 2-ethylhexyl acrylate, 2-ethylhexyl methacrylate, 2-hydroxyethyl acrylate, 2-hydroxyethyl methacrylate, hydroxypropyl methacrylate, ethylene glycol dimethacrylate, isobornyl methacrylate and lauryl methacrylate; vinyl aromatics such as styrene and vinyl toluene; acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

Generally, the ethylenically unsaturated monomer(s) comprise about 1 to about 85 percent by weight of the components used to produce the polymeric particles based upon the total weight of components used to produce the polymeric particles, such as about 40 to about 80 weight percent, or about 50 to about 70 weight percent.

Any of the polymeric particles described above can include hydroxyl functional groups, which are often incorporated into the polymer by including one or more hydroxyl functional monomers in the reactants used to produce the polymer. Useful hydroxyl functional monomers include hydroxyalkyl acrylates and methacrylates, for example those having 2 to 6 carbon atoms in the hydroxy alkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates. Including hydroxyl functional materials in the polymer particle components can provide fast drying under ambient conditions (about 25° C. and atmospheric pressure).

Urethane functional groups can be included in the polymeric particles by copolymerizing the monomers with a urethane functional monomer such as the reaction product of an ethylenically unsaturated isocyanate with an alkanol.

Urea functional groups can be included in the polymeric particles by copolymerizing the monomers with a urea functional monomer such as hydroxyethyl ethylene urea (meth)acrylate.

Ureido functional groups can be included in the polymeric particles by copolymerizing the monomers with a ureido functional monomer such as ethylimidazolidone (meth)acrylates and ethylimidazolidone (meth)acryamides. Useful ureido functional materials include the NORSOCRYL ureido functional monomers commercially available from Elf Atofina.

In one embodiment, the polymeric particles have a glass transition temperature greater than 5° C. and are prepared from one or more nitrile functional materials and one or more hydroxy functional materials, such as acrylonitrile and hydroxyethyl methacrylate. The weight ratio of nitrile functional material to hydroxy functional material can range from about 5:95 to about 95:5, such as about 10:3 to about 10:4.

In an alternative embodiment, acrylic polymeric particles having a glass transition temperature greater than +10° C. (or even greater than about +20° C.) are prepared from one or more hydroxy functional materials such as hydroxyethyl methacrylate; one or more acid functional materials such as (meth)acrylic acid; and one or more acrylate monomers such as butyl acrylate and methyl methacrylate. These acrylic polymeric particles are generally uniform, i.e., not core-shell. In this embodiment, the amount of hydroxy functional materials used to prepare the particles can range from about 1 to about 25 weight percent; the amount of acid functional materials can range from about 0.1 to about 10 weight percent; and the amount of acrylate monomers can range from about 65 to about 98.9 weight percent, based on the total weight of the monomer components used to prepare the polymeric acrylic particles.

Other components used in forming the polymeric particles include polyesters, surfactants, initiators, chain transfer agents and solvents. Suitable polyesters include hydroxy functional ethylenically unsaturated polyesters. Useful surfactants include sodium lauryl sulfate. Examples of useful chain transfer agents include tertiary alkyl mercaptans, mercaptoethanol, ethanol and isopropanol. Suitable solvents include butyl ether of dipropylene glycol, methyl ether of propylene glycol and xylene.

Methods for polymerizing acrylic monomers with themselves and/or other addition polymerizable monomers and preformed polymers are well known to those skilled in the art of polymers. For example, polymerization of acrylic monomers can be carried out in an aqueous or nonaqueous solvent, in emulsion form, suspension form, or in any other method known in the art to make polymerizable particles. A particularly suitable means for preparing the acrylic polymer is by emulsion polymerization.

The number average molecular weight ($M_n$) of the polymeric particles can range from, for example, about 1000 to about 1,000,000 grams per mole or even greater, as determined by gel permeation chromatography using a polystyrene standard. The calculated glass transition temperature from the Fox equation of the polymeric particles can range from about −65° C. to about +120° C., such as about −40° C. to about +100° C., or about −25° C. to about +75° C.

The acid functional groups, if present, can be neutralized using amines such as dimethylethanolamine, ammonia, triethanolamine, dimethylethyl ethanolamine or N',N'-dimethyl aminopropylamine or alkali metal salts such as sodium or potassium hydroxide. In one embodiment, the coating composition comprises a first aqueous dispersion of polymeric particles having a glass transition temperature greater than 5° C. (such as greater than about 10° C.) prepared from a first nitrile functional material, and a second aqueous dispersion of polymeric particles having a glass transition temperature greater than 5° C. (such as greater than about 10° C.) prepared from a second nitrile functional material, the polymeric particles of the first aqueous dispersion being different from the polymeric particles of the second aqueous dispersion. For example, chemically different nitrile functional materials can be used for the first polymeric particles than the second polymeric particles and/or other different components can be used for the first polymeric particles than the second polymeric particles. The weight ratio of the amount of the first aqueous dispersion to the second aqueous dispersion can range from about 5:95 to about 95:5.

In another embodiment involving two aqueous dispersions, the polymeric particles of the first aqueous dispersion are prepared from at least an acrylonitrile material and polyoxyalkylene acrylate and the polymeric particles of the second aqueous dispersion are prepared from at least an acrylonitrile material and a hydroxy functional material. The weight ratio of the first aqueous dispersion to the amount of the second aqueous dispersion can range from about 5:95 to about 95:5, such as about 4:1 to about 5:1. In one embodiment, polymeric particles are a blend of two different types of polymeric particles, one type being prepared by polymerizing acrylonitrile, butyl acrylate, methoxy polyoxyethylene glycol methacrylate, methyl methacrylate and methacrylic acid, the second type being prepared by polymerizing acrylonitrile, butyl acrylate, hydroxyethyl methacrylate, methyl methacrylate and methacrylic acid.

Yet, another embodiment of the present invention is a coating composition comprising a blend of a first aqueous dispersion of polymeric particles having a glass transition temperature greater than 5° C. and being prepared from a nitrile functional material, and a second aqueous dispersion of polymeric particles having a glass transition temperature greater than 5° C. and being prepared from a hydroxy functional material. The weight ratio of the amount of the first aqueous dispersion to the amount of the second aqueous dispersion can range from about 5:95 to about 95:5, such as about 4:1 to about 5:1.

The dispersion of polymeric particles in an aqueous medium can be prepared by conventional emulsion polymerization techniques well known to those skilled in the art. The aqueous particle dispersions can be prepared by a conventional emulsion batch process or a continuous process. In one example of a batch process, the unreacted pre-emulsion of water and monomer is fed over a period of about 1 to 4 hours into a heated reactor initially charged with water. The initiator can be fed in simultaneously, it can be part of the preemulsion or it can be charged to the reactor before feeding in the The optimum temperature depends upon the specific initiator being used. The length of time typically ranges from about 2 hours to about 6 hours. The temperature of reaction can range from about 25° C. to about 90° C.

In one embodiment, water and a small portion of the alkyl acrylate monomers are charged to a reactor with a small amount of surfactant and free radical initiator to form a seed. A pre-emulsion of the remaining monomers, surfactant and water are fed along with the initiator over a prescribed period of time (such as three hours) at a reaction temperature of 80–85° C. using a nitrogen blanket. After a one-hour hold upon completion of the monomer feed, an additional initiator such as hydrogen peroxide/isoascorbic acid can be added to reduce residual free monomer. The latex product is neutralized to a pH of about 8.

In order to conduct the polymerization of the ethylenically unsaturated monomers, a free radical initiator is used. Water soluble and oil soluble initiators can be used. Examples of water soluble initiators include ammonium peroxydisulfate, potassium peroxydisulfate and sodium peroxydisulfate. Examples of oil soluble initiators include t-butyl hydroperoxide, dilauryl peroxide, t-butyl perbenzoate and 2,2'-azobis (isobutyronitrile). Preferably, redox initiators such as ammonium peroxydisulfate/sodium metabisulfite or alkyl hydroperoxide or hydrogen peroxide/isoascorbic acid are utilized herein.

Alternatively, the dispersion of polymeric particles in an aqueous medium can be prepared by a high shear technique such as microfluidization by use of a MICROFLUIDIZER® which is available from Microfluidics Corporation in Newton, Mass. The MICROFLUIDIZER® high pressure impingement emulsifier is disclosed in U.S. Pat. No. 4,533,254. The device consists of a high pressure (up to about $1.4 \times 10^5$ kPa (20,000 psi)) pump and an interaction chamber in which emulsification takes place. The pump forces the mixture of reactants in aqueous medium into the chamber where it is split into at least two streams that pass at very high velocity through at least two slits and collide, resulting in the particulation of the mixture into small particles. Generally, the reaction mixture is passed through the emulsifier once at a pressure of between about $3.5 \times 10^4$ and about $1 \times 10^5$ kPa (5,000 and 15,000 psi). Multiple passes can result in smaller average particle size and a narrower range for the particle size distribution. When using the MICROFLUIDIZER® emulsifier, stress is applied by liquid-liquid impingement as has been described. It should be understood that, if desired, other modes of applying stress to the pre-emulsification mixture can be utilized so long as sufficient stress is applied to achieve the requisite particle size distribution. For example, one alternative manner of applying stress would be the use of ultrasonic energy.

Once the polymerization is complete, the resultant product is a stable dispersion of polymer particles in an aqueous medium; the resultant polymer particles are, of course, insoluble in the aqueous medium. The aqueous medium is substantially free of water soluble polymer. As used herein, "substantially free" means that the aqueous medium contains no more than 30 percent by weight of dissolved polymer, such as no more than 15 percent. By "stable dispersion" is meant that the polymer particles do not settle upon standing and essentially do not coagulate or flocculate during manufacturing or on standing.

The particle size of the polymer particle dispersion can be uniform and small, i.e., after polymerization less than 20 percent of the polymer particles have a mean diameter greater than 5 microns, or greater than 1 micron. Generally, the particles have a mean diameter from about 0.01 microns to about 10 microns. In one embodiment, the mean diameter of the particles after polymerization ranges from about 0.05 microns to about 0.5 microns. The particle size can be measured with a particle size analyzer, such as the Coulter N4 instrument commercially available from Coulter, by following the detailed instructions provided by the manufacturer. Briefly, a sample of the aqueous dispersion is diluted with water until the sample concentration falls within the specified limits of the instrument.

Generally, the particle dispersions are materials of relatively low viscosity. Dispersions can be prepared directly with a total solids content of from about 20 percent to about 70 percent. The molecular weight of the polymer and viscosity of the claimed aqueous dispersions are independent of each other. The weight average molecular weight can range from several thousand to greater than 1,000,000 grams per mole.

The particle can be either internally crosslinked or uncrosslinked. When the particles are internally crosslinked, they are referred to as a microgel. Monomers used in preparing the particle so as to render it internally crosslinked include those ethylenically unsaturated monomers having more than one site of unsaturation, such as ethylene glycol dimethacrylate, allyl methacrylate, hexanediol diacrylate, methacrylic anhydride, tetraethylene glycol diacrylate, tripropylene glycol diacrylate, and the like.

The coating composition can further comprise one or more polymeric film-forming materials chemically different from the polymeric particles discussed above. Useful polymeric film-forming materials include polyepoxides, polyurethanes, polyamides, polyesters, polyacrylates, polyvinyl chlorides and mixtures and copolymers thereof.

Useful polyepoxides have at least two epoxide or oxirane groups per molecule and include epoxy-functional oligomers, polymers and/or copolymers. Generally, the epoxide equivalent weight of the epoxy-functional polymer can range from about 70 to about 4,000, as measured by titration with perchloric acid and quaternary ammonium bromide using methyl violet as an indicator. Suitable epoxy-functional polymers can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials include polyepoxides comprised of epoxy polyethers obtained by reacting an epihalohydrin (such as epichlorohydrin or epibromohydrin) with a di- or polyhydric alcohol in the presence of an alkali, such as diglycidyl ethers of bisphenol A, for example EPON® 828 epoxy resin which is commercially available from Shell Chemical Company.

Useful thermoplastic polymeric film-forming materials include polyvinyl acetate; aromatic vinyl polymers; vinyl copolymers having vinyl aromatic hydrocarbons as monomer components such as polystyrene, styrene-butadiene copolymers, styrene-divinylbenzene copolymers and styrene-acrylonitrile copolymers; saturated polyesters including saturated aliphatic polyesters such as polyneopentyl adipate, polypropylene adipate and poly epsilon-caprolactone; polyacrylates such as polyalkyl (meth)acrylates having alkyl groups with 1–8 carbon atoms, polymethacrylates or polyalkyl(meth)acrylates obtained by polymerization of methyl methacrylate, isobutyl methacrylate and 2-ethylhexyl acrylate; saturated polyester urethanes; polybutadienes; polyvinyl chlorides and polyvinyl chloride/acetates. Useful substantially saturated polyesters are prepared from polyfunctional acids and polyhydric alcohols by methods such as are disclosed in U.S. Pat. No. 4,739,019 at column 3, line 22 through column 5, line 15.

In one embodiment, a polyacrylate film-forming material such as a polyacrylate copolymer emulsion prepared from methyl acrylate, butyl acrylate, methyl methacrylate and methacrylic acid is included in the coating composition. Such a product is commercially available from BASF Corporation as ACRONAL DS 3502. The film-forming material, if used, is present in the coating composition in an amount ranging from about 1 to about 40 percent by weight based on the total resin solids of the composition, such as about 5 to about 30 percent by weight.

The coating composition can further comprise one or more fillers for improving the vibration and sound dampening capabilities of the coating. Also, density differences between the filler and latex help dissipate sound energy throughout the film, as measured by Oberst density. Even distribution of the filler between the particles provides better acoustic properties, and the filler further helps to suppress mechanical vibration of the substrate and thereby inhibit sound transmission. Significantly, the polymer particles maintain their array even when filler is used and the coating material dries. Useful fillers include mica, powdered slate, montmorillonite flakes, glass flakes, metal flakes, graphite, talc, iron oxide, clay minerals, cellulose fibers, mineral fibers, carbon fibers, glass or polymeric fibers or beads, ferrite, calcium carbonate, calcium, magnesium carbonate, barytes, ground natural or synthetic rubber, silica, aluminum hydroxide, alumina powder and mixtures thereof. The filler material can comprise about 20 to about 90 weight percent of the coating composition on a basis of total weight of the coating composition, such as about 50 to about 80 weight percent. In one embodiment, the particles comprise about 30 weight percent of the coating composition and the filler 70 percent.

Additionally, one or more plasticizers can be included in the coating when using the polymers and copolymers described above. Non-limiting examples of suitable plasticizers include adipates, benzoates, glutarates, isophthalates, phosphates, polyesters, sebacates, sulfonamides and terephthalates. The amount of plasticizer can range from about 0.1 up to about 50 weight percent of the total weight of the coating composition.

The compositions of the present invention can include a variety of optional ingredients and/or additives that are somewhat dependent on the particular application of the composition, such as dyes or pigments like carbon black or graphite, reinforcements, thixotropes, accelerators, surfactants, extenders, stabilizers, corrosion inhibitors, diluents, blowing agents and antioxidants. Suitable thixotropes include fumed silica, bentonite, stearic acid-coated calcium carbonate, fatty acid/oil derivatives and associative urethane thickeners such as RM-8, which is commercially available from Rohm and Haas. Thixotropes are generally present in an amount of up to about 20 weight percent of the total composition. Optional additional ingredients such as carbon black or graphite, blowing agents, expandable polymeric microspheres or beads, such as polypropylene or polyethylene microspheres, surfactants and corrosion inhibitors like barium sulfonate are generally present in an amount of less than about 5 weight percent of the total weight of the composition.

The viscosities of these coating products are application-specific based on the type of equipment used, the desired film thickness and the sag resistance. Typically, the viscosity of the coating composition will be greater than 1000 centipoise ("cp"), and ranges from about 1000 to about 1,000,000 cp measured at 2 RPM with a #7 spindle Brookfield measurement. Sprayable compositions typically have viscosities below about 100,000 cp at 20 RPM reading on the Brookfield viscometer at ambient temperature (about 25° C.).

In order to obtain the advantages of a high solids waterborne coating composition, the coating composition should have appropriate viscosity to allow adequate atomization of the coating during spray application. The viscosity of the primary coating composition can be controlled partially by choosing components and reaction conditions that control the amount of hydrophilic polymer in the aqueous phase and on the surface of the polymeric particles. Interactions among particles affects the rheology of coatings containing them. They can be greatly affected by the ionic charge density on the surface of the particles. Charge density can be controlled by use of an acid comonomer. The amount of acid on the particle can also be increased by increasing the pH of the aqueous medium in which the polymerization takes place.

The coating composition can be prepared by mixing the polymeric particle dispersion with the other components of the coating composition in a high energy vacuum mixer such as Dual Disperser Model HHL-2-1000 commercially available from Hockmeyer.

The compositions can be applied to the surface of a substrate in a number of ways, including spraying, extrusion, or by hand with a blade. Substrates within the present invention include those formed from metal, polymers, such as thermoset materials and thermoplastic materials, and combinations of metal and polymeric substrates. Suitable metal substrates that can be coated according to the present invention include ferrous metals such as iron, steel, and alloys thereof, non-ferrous metals such as aluminum, zinc, magnesium and alloys thereof, and combinations thereof. Preferably, the substrate is formed from cold rolled steel, electrogalvanized steel such as hot dip electrogalvanized steel or electrogaivanized iron-zinc steel, aluminum or magnesium. The metal substrate to be treated can be bare, pretreated or prepainted (for example by electrocoating) prior to application of the coating.

Useful thermoset materials within the present invention include polyesters, epoxides, phenolics, polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, EPDM rubber, copolymers and mixtures thereof.

The coatings of the present invention, when applied to a substrate, can provide fast-drying, mudcrack resistant coatings that can inhibit sound and/or vibration transmission through the substrate. Dry film thickness can typically be about 20 mils to as high as about 100 mils.

The present invention is therefore further directed to a method for inhibiting sound transmission through a substrate. The method generally comprises applying to the substrate the present coating composition and at least partially drying the coating composition. Application can be through any means known in the art. Drying can be effected by air drying or heating up to 200° C.

cal stirrer, condenser, nitrogen sparge and a heating mantle. The components used to prepare each of Samples 1–6 and Comparative Sample 1 are shown in Table 1.

Water and a small portion of the methyl methacrylate and butyl acrylate were charged to the reactor with a small amount of ALIPAL surfactant and ammonium persulfate free radical initiator to form a seed. A pre-emulsion of the remaining monomers, surfactant and water were fed along with the initiator over about 3 hours at a reaction temperature of 80–85° C. using a nitrogen blanket. After a one monomer feed, a post redox feed including hydrogen peroxide/isoascorbic acid to reduce residual free monomer was added to the reactor. The latex was neutralized to a pH of about 8 with dimethylamino ethanol. The final pH of each of the latexes was about 7.5–8.5, the nonvolatile content was 39–40%, the Brookfield viscosity was 100–200 cps (spindle #1, 50 rpm), and the particle size was 100–200 nanometers.

TABLE 1

| Component | Sample 1 | Sample 2 | Sample 3 | Sample 4 | Sample 5 | Sample 6 | Comp. Sample 1 |
|---|---|---|---|---|---|---|---|
| Monomer Components | | | Weight of Component (grams) | | | | |
| Methyl methacrylate | 26.4 | 162.62 | 66.1 | 212.74 | 26.4 | 13.2 | 44.3 |
| Butyl acrylate | 785 | 392.56 | 1506.7 | 301.35 | 754.6 | 377.3 | 231 |
| Acrylonitrile | 298.8 | 0 | 997.6 | 0 | 399 | 199.5 | 0 |
| Hydroxyethyl methacrylate | 0 | 0 | 350.3 | 70.05 | 0 | 0 | 0 |
| Methoxy polyoxyethylene glycol methacrylate[1] | 70.2 | 35.08 | 0 | 0 | 0 | 0 | 0 |
| Ethylhexyl acrylate | 0 | 0 | 30 | 6 | 0 | 0 | 0 |
| Methacrylic Acid | 15 | 7.5 | 37.5 | 7.5 | 15 | 7.5 | 0 |
| Methyl acrylate | 0 | 0 | 0 | 0 | 0 | 0 | 584.3 |
| Butyl methacrylate | 0 | 0 | 0 | 0 | 0 | 0 | 17.7 |
| Styrene | 0 | 0 | 0 | 0 | 0 | 0 | 8.9 |
| Total Monomer Amount | 1195.4 | 597.76 | 2988.2 | 597.64 | 1195 | 597.5 | 885.4 |
| Other Components | | | | | | | |
| ALIPAL CO436[2] | 21.4 | 10.71 | 53.6 | 10.71 | 21.4 | 10.7 | 9.52 |
| Ammonium Persulfate | 4.3 | 2.15 | 10.8 | 2.15 | 4.3 | 2.1 | 3.17 |
| Hydrogen Peroxide 50% in water | 4.8 | 2.39 | 12 | 2.39 | 4.8 | 2.4 | 1.77 |
| Isoascorbic Acid | 2.4 | 1.2 | 6 | 1.2 | 2.4 | 1.2 | 1.8 |
| Volatiles | | | | | | | |
| Dimethyl amino ethanol | 13.1 | 6.57 | 32.9 | 6.57 | 13.1 | 6.6 | 9.7 |
| Deionized Water | 1768.2 | 884.1 | 4420.5 | 884.1 | 1768.2 | 884.1 | 1080.64 |

[1]MA-550 methoxy polyethylene glycol methacrylate ($M_w$ about 550 grams per mole) commercially available from La Porte Chemicals, Houston, Texas.
[2]ALIPAL CO436 surfactant commercially available from Rhodia as Rhodapex CO-436.

EXAMPLES

The following examples are intended to illustrate the invention, and should not be construed as limiting the invention in any way.

Examples 1–6

The polymeric materials were prepared in a four neck round bottom flask equipped with a thermometer, mechani- About 200 g of coating were prepared from each polymeric dispersion of Samples 1–6 and Comparative Sample 1. Each dispersion was mixed at low agitation in a pint-sized container using an air driven motor for about 1 minute. FOAMMASTER 111 hydrocarbon defoamer (commercially available from Cognis) was added to the dispersion and mixed for about 1 minute, followed by slow addition of DOLOCRON 4512 magnesium calcium carbonate (commercially available from Specialty Minerals) and mixed for about 5 minutes. The mixing speed was increased as components were added to maintain a vortex throughout the procedure. RM-8 water soluble polyurethane thickener (commercially available from Rohm and Haas) was added to the mixture and mixed for 7–10 minutes. Each sample was placed in a vacuum chamber equipped with an agitator and a vacuum of at least 700 mm Hg was applied with the agitator turning the material. The sample was removed when foaming subsided (about 3–5 minutes).

Draw downs of 3–4 inches long of the samples using a 2-inch wide 100-mil thick coating template were prepared on test panels coated with ED-6100 electrocoat which is commercially available from PPG Industries, Inc. of Pittsburgh, Pennsylvania. Each draw down was air dried at ambient temperature (about 25° C.), one set at 30% relative humidity and the other set at 60% relative humidity.

The degree of dryness was measured in the center area using a Shore "00"hardness gauge according to ASTM D 2240-97. Higher Shore hardness values indicate drier or stiffer coatings.

Mudcracking was evaluated on a separate set of panels. The mudcracking determination was a visual determination based upon number, width and length of cracks. The coating on each panel was dried for two hours at ambient temperature (about 25° C.) at the indicated relative humidity and then for 22 additional hours at ambient temperature and relative humidity (about 50%).

The sound damping of each coating was measured using the Oberst ASTM Test Method E756-93 ("Standard Test Method for Measuring Vibration-Damping Properties of Materials", Sections 3 and 10. The principle measure of sound deadening in this test is loss factor, represented by the Greek letter, eta [η], the ratio of loss modulus to storage modulus of the material. Oberst values at a thickness of 30 mils typically range from 0.001 for uncoated steel (if the steel panel is struck, one would hear a "clang") to 0.01 ("bong") to 0.1 ("bunk") to 0.5 ("thud") for increasingly efficient coatings. The Oberst test measures the sound loss factor of the coating-substrate composite.

Each test sample was applied to an Oberst Bar, which is a metal bar formed from special oil-hardening ground flat stock, AISI/SAE GRD 0-1, 1/32 inch (0.8 mm) thick, ½ inch (12.7 mm) wide from McMaster-Carr, part number 89705-K121, and dried for 6 days in ambient air (about 25° C.). The thickness of each cured coating was 0.070.+/−0.01 inches (1.8 mm). The Oberst loss factor values were normalized to 0.070 inches thickness for comparison. Composite loss factors were compared at 200, 400, 600 and 800 Hz. Average values equal to or above about 0.05 are generally regarded as providing good results; the higher the value the more optimum the result.

TABLE 2

| Components | EX-1 | EX-2 | EX-3 | EX-4 | EX-5 | EX-6 |
|---|---|---|---|---|---|---|
| Sample 1 | 62.7 | — | — | — | — | 42.7 |
| Sample 2 | — | 62.7 | — | — | — | — |
| Sample 3 | — | — | 62.7 | — | — | 10 |
| Sample 4 | — | — | — | 62.7 | — | — |
| Acronal DS 3502[3] | — | — | — | — | 62.7 | 10 |
| Foammaster 111[4] | 0.1 | 0.1 | 0.1 | 0.1 | 0.1 | 0.1 |
| Dolocron 4512[5] | 140 | 140 | 140 | 140 | 140 | 140 |
| Acrysol RM-8[6] | 0.2 | 0.2 | 0.2 | 0.2 | 0.2 | 0.2 |
| Total | 203 | 203 | 203 | 203 | 203 | 203 |
| Acrylic Composition (solids %) | | | | | | |
| Methyl methacrylate | 2.2 | 27.2 | 2.2 | 35.6 | 5 | |
| Butyl acrylate | 65.7 | 65.7 | 50.4 | 50.4 | 26 | |
| Acrylonitrile | 25.0 | — | 33.4 | — | | |
| Hydroxyethyl methacrylate | — | — | 11.7 | 11.7 | | |
| Methoxy polyethylene glycol methacrylate[7] | 5.9 | 5.9 | — | — | | |
| Ethylhexyl acrylate | — | — | 1.0 | 1.0 | | |
| Methacrylic Acid | 1.3 | 1.3 | 1.3 | 1.3 | | |
| Methyl acrylate | | | | | 66 | |
| Butyl methacrylate | | | | | 2 | |
| Styrene | | | | | 1 | |
| TOTAL | 100.0 | 100.0 | 100.0 | 100.0 | 100 | |
| Degree of Drying . . . Shore 00* . . . | | | | | | |
| 30% Rel. Humidity, 2 hrs. | 79–84 | 38–44 | 89–95 | 65–71 | 60–64 | 81–87 |
| 60% relative humidity, 2 hrs. | 55–60 | 15–20 | 70–75 | 50–65 | 55–60 | 75–80 |
| Mudcracking, | | | | | | |
| 30% Rel. Humidity | slight | sl–mod | severe | Mod–severe | moderate | slight |

TABLE 2-continued

| Components | EX-1 | EX-2 | EX-3 | EX-4 | EX-5 | EX-6 |
| --- | --- | --- | --- | --- | --- | --- |
| 60% Relative Humidity | slight | sl–mod | severe | Mod–severe | moderate | slight |
| Oberst Loss Factor, 6 days air dry - normalized for .07" thickness | | | | | | |
| @ +25 C. | | | | | | |
| 200 Hz | 0.204 | 0.030 | 0.030 | 0.127 | 0.231 | 0.146 |
| 400 Hz | 0.425 | 0.051 | 0.030 | 0.126 | 0.533 | 0.147 |
| 600 Hz | 0.646 | 0.072 | 0.035 | 0.125 | 0.835 | 0.147 |
| 800 Hz | 0.867 | 0.092 | 0.039 | 0.124 | 1.137 | 0.148 |
| @ +55 C. | | | | | | |
| 200 Hz | 0.026 | 0.002 | 0.143 | 0.090 | 0.022 | 0.063 |
| 400 Hz | 0.043 | 0.006 | 0.224 | 0.157 | 0.022 | 0.107 |
| 600 Hz | 0.060 | 0.011 | 0.306 | 0.223 | 0.022 | 0.151 |
| 800 Hz | 0.077 | 0.016 | 0.388 | 0.289 | 0.023 | 0.194 |

[3] ACRONAL DS 3502 is an aqueous dispersion of an acrylic copolymer 55% solids commercially available from BASF Corp, which is believed to be prepared from about 66% methyl acrylate, 26% butyl acrylate, 5% methyl methacrylate, 2% butyl methacrylate, and 1% styrene based upon weight of total resin solids.
[4] FOAMMASTER 111 hydrocarbon defoamer commercially available from Cognis Canada
[5] DOLOCRON 4512, dolomite calcium magnesium carbonate commercially available from Specialty Minerals.
[6] ACRYSOL RM-8 rheology modifier water soluble polyurethane commercially available from Rohm & Haas.
[7] MA-550 methoxy polyethylene glycol methacrylate ($M_w$ about 550 grams per mole) commercially available from La Porte Chemicals, Houston, Texas.

As shown in Table 2 coating compositions prepared according to the present invention (Ex. 1, 3, 4 and 6) provided good sound deadening properties at both temperatures. In addition, several of the Examples, especially 1 and 6. demonstrate that the coatings of the present invention have good dry times, hardness, and mudcracking resistance.

Example 7

Several of the latex materials prepared in Example 1 above and a sample of ACRONAL DS 3502 were examined optically to investigate the microscopic structure of the dried films formed by these materials. Thin films of the latex materials were formed by dipping and then removing microscope slides (2947, Corning Glass Works, Corning, N.Y.) into each respective latex material.

The wet films of latex material prepared according to the present invention (Runs a–e) exhibited strong opalescence when viewed under normal lighting conditions (artificial white light or natural daylight) at ambient temperature (about 25° C. and a relative humidity of about 65%). Run f (ACRONAL DS 3502 latex) did not exhibit opalescence under the same conditions. The observed opalescent color of Samples 1, 3, 4 and 5 changed as the film dried. Sample 1 changed color from red to green, Sample 3 changed color from green to blue, Sample 4 changed color from blue to violet, Sample 5 changed color from green to blue; Sample 2 remained blue. Other optical observations are summarized in Table 3 below.

The ultraviolet and visible light extinction of the films of latex materials were evaluated at a temperature of about 25° C. and a relative humidity of about 65% using a Model Lambda 2 spectrophotometer (available from Perkin Elmer Corporation of Norwalk, Conn.). Extinction is a measurement of light that is not transmitted through a material due to absorbence, scattering and/or reflection of that light by the material, as is well known to those skilled in the art. The extinction measurements were performed 2 minutes after application of the latex materials described above. After 20 minutes of drying, the ultraviolet and visible light extinction of the films of latex materials were recorded again using the same spectrophotometer, and the films were observed again visually. The optical observations are summarized in Table 3.

TABLE 3

| Run | Sample (Refer to Table 1 Above for Composition) | Summary of optical observations |
| --- | --- | --- |
| A | Sample 1 | Visible Bragg Diffraction after 2 minutes of drying. Film hazy on drying. |
| B | Sample 3 | Visible Bragg Diffraction after 2 minutes of drying. Film clear on drying. |
| c | Sample 4 | Visible Bragg Diffraction after 2 minutes of drying. Film clear on drying. |
| d | Sample 2 | Visible Bragg Diffraction after 2 minutes of drying. Film hazy on drying. |
| e | Sample 5 | Visible Bragg Diffraction after 2 minutes of drying. Film hazy on drying. |
| f | ACRONAL DS 3502 | No Bragg Diffraction after 2 minutes of drying Film clear on drying. |

FIG. 1 graphs extinction as a function of wavelength (nm) for the Samples used in Runs a–e; narrow wavelength range extinction features are due to Bragg diffraction. The observation of Bragg diffraction from the Samples used in Runs a–e indicates that the latex particles are both highly monodisperse and arranged in a highly ordered three dimensional structure, the periodicity of which is comparable to ultraviolet and/or visible and/or infrared wavelength of light.

Example 8

Several of the latex materials prepared in Example 1 above including Samples 1, 3, 4 and 5, a sample of ACRONAL DS 3502 and Comparative Sample 1 (prepared from the same monomers in the same relative amounts as those believed to be used to prepare ACRONAL DS 3502) were examined using atomic force microscopy (AFM) to investigate the microscopic structure of the films formed by these materials upon drying.

Samples were diluted with deionized water (to 50% volume) to form more dilute aqueous suspensions. One to two drops of each diluted aqueous suspension were deposited onto a microscope coverslip and dried in air. Samples were imaged with a Multimodeo® atomic force microscope (AFM) (Digital Instruments, Santa Barbara, Calif.) in intermittent contact mode. FESP Nanoprobe™ tips (Digital Instruments) with 75.0 kHz resonant frequency were used for imaging in air. Phase imaging techniques, well known to those skilled in the art, were used to detect phase segregation. FIGS. 2 through 50 show height, or topographical, images or chemical phase images of dried films formed by these latex materials.

The dependence of the sample topography on the mean applied force indicates the relative stiffness of different regions within each sample. Each sample was subjected to "light tapping" to determine the height of the particles within the sample. "Light tapping" traces the shape of each particle in a selected region of the sample with an oscillating cantilevered tip probe. As the tip of the probe approaches the particle, the frequency of the response is measured. The measured damping of the oscillations is correlated to generate a topographical image of the surface of the particles which indicates relative height of portions of the particle surface.

The same section of each sample was also subjected to "hard tapping" in which the probe is oscillated such that the surface of the particle is subjected to deformation. The measured damping of the oscillations is correlated to generate a phase image of the relative hard/soft or elastic/lossy regions of the particles. Softer or stickier regions of the particles will exhibit a return oscillating or damping curve that is out of phase with the curve of the oscillation applied to the probe. Harder regions will exhibit little or no phase shift from the curve of the oscillation applied to the probe. "Hard tapping" delivers more contrast between areas of different phase, i.e., soft or hard areas, while "light tapping" is used for more accurate height determination. Elastic regions are indicated in FIGS. 2–50 by the green color and lossy regions are indicated by the yellow color. Particles having different colors are not homogeneous. As used herein, "lossy" means that the region loses applied energy (for example energy applied by a sound wave) to heat or deformation of the particle. The energy can be dissipated through or along the surface of the particle.

The topographical and phase observations are summarized in Table 4 and shown in FIGS. 2–50. The scale on the right side of each Figure is the height scale (z-axis) of the particles determined from the height, or topographical, image of the sample in nanometers. The scale on the left side and bottom of each Figure is the sample period, i.e., the distance (micrometers) between the centers of adjacent particles (determined by Fourier transform by the AFM). The Phase Bar to the right of the figures indicates relative tip interaction with the particle surface as a function of change of phase of oscillation of the AFM cantilever probe that results from different interactions of the tip with regions of different physical properties (hardness vs. softness, for example). Coalescence is determined by the ratio of the overall height scale to the sample period. The lower the value, the more coalescence of the particles. The higher the value, the less coalescence of the particles; lower coalescence means that the particles exhibit a more defined individual shape. Phase segregation is determined by phase images which show different interactions between the probe tip and the sample in different spatial regions. The green particles of the phase images demonstrate that like phases orient toward each other.

TABLE 4

| Run | Sample (refer to Table 1 above for composition) | Sample period, (nm) | Relative height scale (µm) | Summary of topographical and phase contrast observations |
|---|---|---|---|---|
| G | Sample 1 | 190 | 4 | Particles form hexagonal close packed structure. Phase segregation within individual particles. Minor phase minor is hard compared to surrounding phase. Like phases tend to orient toward each other. |
| H | Sample 3 | 200 | 5 | Particles form hexagonal close packed structure. Phase segregation within individual particles. Minor phase minor is hard compared to surrounding phase. Like phases tend to orient toward each other. |
| i | Sample 4 | 170 | 10 | Particles form hexagonal close packed structure. No phase segregation. |
| j | Sample 2 | 175 | 2 | Particles form hexagonal close packed structure, but with some coagulation. No phase segregation. |
| k | Sample 5 | 190 | 50 | Particles form hexagonal close packed structure. Minor phase segregation within individual particles. |
| l | ACRONAL DS 3502 | — | 10 | No discrete particles evident. Large areas of phase segregated material observed indicating coalescence. Discontinuous phase is softer than continuous phase. |

The micrographs of film-forming materials prepared according to the present invention (Runs g–k) exhibit hexagonal closely packed structures and minimal coalescence. Phase segregation is shown in Runs g, h, and k, which indicates the ability to dissipate sound more effectively than a material which does not exhibit phase segregation. This phase segregation can be the result of including monomers in the preparation of each particle that have differing glass transition temperatures, such as butyl acrylate (about −55° C.) and methyl methacrylate or acrylonitrile (about +100° C.). The sample of Run I exhibited surface roughness but no evidence of discrete uncoalesced particles.

Whereas particular embodiments of this invention have been described above for purposes of illustration, it will be evident to those skilled in the art that numerous variations of the details of the present invention may be made without departing from the invention as defined in the appended claims.

What is claimed is:

1. A coating composition comprising a dispersion of particles, said particles comprising polymers produced from monomers having different glass transition temperatures, the difference in glass transition temperatures ranging from 50 to 260° C., and exhibiting phase segregation between areas of differing glass transition temperature within each particle, such that when said coating composition is applied to a substrate, said particles form a geometrically ordered array and said coating composition, when dried, is capable of dissipating frequencies of sound in the range of about 400 to about 20,000 Hz, wherein said polymer particles comprise one or more nitrile functional materials, one or more amide functional materials, one or more carbamate functional materials or mixtures thereof and wherein said polymer particles further comprise one or more polyoxyalkylene acrylates.

2. The coating composition of claim 1, wherein said coating is comprised of more than one array layer.

3. The coating composition of claim 1, wherein at least 5 percent of said particles are present in a hexagonal structure.

4. The coating composition of claim 3, wherein at least 50 percent of said particles are present in a hexagonal structure.

5. The coating composition of claim 1, wherein said particles are within +/−10 percent of the mean particle size.

6. The coating composition of claim 5, wherein said mean particle size is between 0.01 and 5 microns.

7. The coating composition of claim 6, wherein said mean particle size is between 0.01 and 0.5 microns.

8. The coating composition of claim 1, wherein the calculated glass transition temperature of said particles is between −90° C. and 175° C.

9. The coating composition of claim 8, wherein said calculated glass transition temperature is between about −65° C. and 135° C.

10. The coating composition of claim 1, wherein said dispersion of particles comprises particles having a first composition and particles having a second composition, and particles comprised of each of the first and second compositions exhibit phase segregation between areas of differing glass transition temperature within each particle.

11. The coating composition of claim 10, wherein the calculated glass transition temperature for the particles having the first composition and the calculated glass transition temperature for the particles having the second composition are different.

12. The coating composition of claim 1, wherein said particles are thermoplastic.

13. The coating composition of claim 1, wherein said polymer particles comprise one or more nitrile functional materials, one or more amide functional materials, one or more carbamate functional materials or mixtures thereof.

14. The coating composition of claim 1, wherein said polymer particles further comprise one or more copolymerizable ethylenically unsaturated monomers.

15. The coating composition of claim 13, further comprising one or more of hydroxyl, urethane, urea or ureido functional groups.

16. The coating composition of claim 1, wherein said polymeric particles comprise one or more hydroxy functional materials, one or more acid functional materials, and one or more acrylate functional materials.

17. A coating composition comprising a dispersion of particles, said particles comprising polymers produced from monomers having different glass transition temperatures, the difference in glass transition temperatures ranging from 50 to 260° C., and exhibiting phase segregation between areas of differing glass transition temperature within each particle, such that when said coating composition is applied to a substrate, said particles form a geometrically ordered array and said coating composition, when dried, is capable of dissipating frequencies of sound in the range of about 400 to about 20,000 Hz, wherein said dispersion of particles comprises particles having a first composition and particles having a second composition, and particles comprised of each of the first and second compositions exhibit phase segregation between areas of differing glass transition temperature within each particle, wherein the first composition comprises polymers produced from methyl methacrylate, butyl acrylate, acrylonitrile, methoxypolyoxyethylene glycol methacrylate, and methacrylic acid, and the second composition comprises polymers produced from methyl methacrylate, butyl acrylate, acrylonitrile, hydroxyethyl methyl methacrylate, ethylhexyl acrylate, and methacrylic acid.

18. The coating composition of claim 13, further comprising one or more polymeric film-forming materials.

19. A substrate coated with the coating composition of claim 1.

20. The substrate of claim 19, wherein said substrate is metal, polymer or combinations thereof.

21. The substrate of claim 19, wherein said coating is between 20 and 100 mils thick when dry.

22. A method for inhibiting sound transmission through a substrate, comprising:
  a) applying to said substrate a dispersion comprising polymeric particles, said particles comprising polymers produced from monomers having different glass transition temperatures, the difference in glass transition temperatures ranging from 50 to 260° C., and exhibiting phase segregation between areas of differing glass transition temperature within each particle, wherein said polymer particles comprise one or more nitrile functional materials, one or more amide functional materials, one or more carbamate functional materials or mixtures thereof and wherein said polymer particles further comprise one or more polyoxyalkylene acrylates; and
  b) at least partially drying said dispersion, wherein said particles form an unfused geometrically ordered array upon drying.

23. The method of claim 22, wherein said dried dispersion forms a coating that is between 20 and 100 mils thick when dry.

* * * * *